United States Patent
Sebastian et al.

(10) Patent No.: US 11,550,045 B2
(45) Date of Patent: *Jan. 10, 2023

(54) SYSTEM AND METHOD FOR FIELD CALIBRATING VIDEO AND LIDAR SUBSYSTEMS USING INDEPENDENT MEASUREMENTS

(71) Applicant: MVI (ABC), LLC, Grandville, MI (US)

(72) Inventors: Richard L. Sebastian, Frederick, MD (US); Anatoley T. Zheleznyak, Great Falls, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,768

(22) Filed: Nov. 15, 2021

(65) Prior Publication Data
US 2022/0260693 A1 Aug. 18, 2022

Related U.S. Application Data

(63) Continuation of application No. 16/025,077, filed on Jul. 2, 2018, now Pat. No. 11,181,625, which is a
(Continued)

(51) Int. Cl.
*A61B 3/14* (2006.01)
*G01C 3/08* (2006.01)
(Continued)

(52) U.S. Cl.
CPC ............ *G01S 7/497* (2013.01); *G01S 7/4817* (2013.01); *G01S 7/4913* (2013.01); *G01S 7/4972* (2013.01); *G01S 17/42* (2013.01); *G01S 17/58* (2013.01); *G01S 17/66* (2013.01); *G01S 17/86* (2020.01); *G01S 17/89* (2013.01); *G06T 7/70* (2017.01); *G06T 7/80* (2017.01); *G06T 2207/10016* (2013.01); *G06T 2207/10028* (2013.01)

(58) Field of Classification Search
CPC ........ G01S 17/89; G01S 17/023; G01S 17/06; G01S 17/32; G01S 17/42; G01S 17/88; G01S 7/497; G01S 17/58; G01S 17/66; G01S 7/4817; G01S 7/4913; G01S 7/4972; G06T 2207/10016; G06T 2207/10028; G06T 7/70; G06T 7/80
See application file for complete search history.

(56) References Cited

U.S. PATENT DOCUMENTS 5,784,023 A * 7/1998 Bluege ................... G01S 17/58
342/104
6,004,314 A * 12/1999 Wei ..................... A61F 9/00821
606/18
(Continued)

*Primary Examiner* — Alison Slater
(74) *Attorney, Agent, or Firm* — Toering Patents PLLC

(57) ABSTRACT

A system uses range and Doppler velocity measurements from a lidar subsystem and images from a video subsystem to estimate a six degree-of-freedom trajectory of a target. The video subsystem and the lidar subsystem may be aligned with one another, and hence calibrated, by determining, for example, a centroid of an iris determined from the lidar subsystem and a centroid of the iris determined from the video subsystem and determining a calibration offset between the two centroids.

16 Claims, 21 Drawing Sheets

Related U.S. Application Data continuation of application No. 14/165,724, filed on Jan. 28, 2014, now Pat. No. 10,018,711.

(51) Int. Cl.

| | |
|---|---|
| *G01P 3/36* | (2006.01) |
| *G01S 7/497* | (2006.01) |
| *G01S 17/42* | (2006.01) |
| *G01S 17/58* | (2006.01) |
| *G01S 17/66* | (2006.01) |
| *G01S 17/89* | (2020.01) |
| *G01S 7/481* | (2006.01) |
| *G01S 17/86* | (2020.01) |
| *G06T 7/80* | (2017.01) |
| *G06T 7/70* | (2017.01) |
| *G01S 7/4913* | (2020.01) |

(56) References Cited

U.S. PATENT DOCUMENTS

| | | | | |
|---|---|---|---|---|
| 7,146,983 B1* | 12/2006 | Hohla | ............... | A61B 5/117 606/4 |
| 7,961,301 B2* | 6/2011 | Earhart | ............... | G01S 7/4816 356/5.01 |
| 2005/0024586 A1* | 2/2005 | Teiwes | ............... | A61B 3/113 351/209 |
| 2006/0187462 A1* | 8/2006 | Srinivasan | ............... | A61B 5/0066 356/479 |
| 2007/0171367 A1* | 7/2007 | Sebastian | ............... | G01S 13/88 351/206 |
| 2008/0277601 A1* | 11/2008 | Phinney | ............... | G06V 10/141 382/117 |
| 2008/0278687 A1* | 11/2008 | Somani | ............... | A61F 9/00806 351/208 |
| 2008/0304012 A1* | 12/2008 | Kwon | ............... | A61B 3/113 351/221 |
| 2009/0228157 A1* | 9/2009 | Breed | ............... | B60W 30/16 701/1 |
| 2010/0204964 A1* | 8/2010 | Pack | ............... | G06T 7/521 703/2 |
| 2010/0253909 A1* | 10/2010 | Dai | ............... | G02C 7/028 351/205 |
| 2010/0271615 A1* | 10/2010 | Sebastian | ............... | G01S 17/34 356/28 |
| 2011/0118609 A1* | 5/2011 | Goldshleger | ............... | A61B 3/107 600/476 |
| 2011/0202046 A1* | 8/2011 | Angeley | ............... | A61F 9/00825 606/6 |
| 2012/0044476 A1* | 2/2012 | Earhart | ............... | G01S 17/58 356/4.01 |
| 2012/0081544 A1* | 4/2012 | Wee | ............... | G01S 17/894 348/140 |
| 2013/0046471 A1* | 2/2013 | Rahmes | ............... | G01S 17/88 702/5 |
| 2013/0280678 A1* | 10/2013 | Towers | ............... | G09B 9/10 434/38 |
| 2014/0132723 A1* | 5/2014 | More | ............... | G01S 7/497 348/46 |
| 2014/0244277 A1* | 8/2014 | Krishna Rao | ............... | G16H 10/60 705/2 |
| 2015/0317781 A1* | 11/2015 | Napier | ............... | G06T 5/002 348/46 |

* cited by examiner

SYSTEM AND METHOD FOR FIELD CALIBRATING VIDEO AND LIDAR SUBSYSTEMS USING INDEPENDENT MEASUREMENTS

CROSS-REFERENCE TO RELATED APPLICATIONS

This Applications is a continuation of U.S. application Ser. No. 16/025,077, which was filed on Jul. 2, 2018, now granted as U.S. patent Ser. No. 11/181,625; which in turn is a continuation application of U.S. application Ser. No. 14/165,724, which was filed on Jan. 28, 2014, now granted as U.S. Pat. No. 10,018,711. Each of the foregoing applications is incorporated herein by reference.

FIELD OF THE INVENTION

The invention is generally related to calibrating video and lidar subsystems with one another and more particularly, to calibrating the video and lidar subsystems using independent measurements from each of these systems.

BACKGROUND OF THE INVENTION

Obtaining accurate three-dimensional (3D) images of a target using a two-dimensional (2D) video camera subsystem integrated with a three-dimensional lidar (laser radar) subsystem is difficult unless the two subsystems are calibrated with one another. Calibration may refer to the registration of the two subsystems with one another such that measurements of points on a surface made by the lidar subsystem are accurately mapped to the same points as measured by the video subsystem (or substantially so within the measurement tolerances, etc., of each subsystem). In other words, accurate three-dimensional images require correspondence between measurements of the 3D coordinates obtained from the lidar subsystem with the respective pixel positions in the 2D video image.

Factory calibration of the subsystems may be useful in obtaining an initial registration between the lidar subsystem and the video subsystem. However, because both the lidar subsystem and the video subsystem employ various mechanical components, the factory calibration may change as a result of various relative mechanical changes occurring within the lidar subsystem as well as between the lidar subsystem and the video subsystems, including, but not limited to mishandling, temperature fluctuations, mechanical strains, and other mechanical effects as would be appreciated. In particular, various moving mechanical parts included in or associated with the lidar subsystem (e.g., scanning mirrors and their alignment to one another and also to the laser beams) are susceptible to such changes.

What is needed is an improved system and method for calibrating the video and lidar subsystems of a three-dimensional measurement system.

SUMMARY OF THE INVENTION

Various implementations of the invention combine measurements generated by a a lidar system with images generated by a video system to resolve a six degrees of freedom trajectory that describes motion of a target. Once this trajectory is resolved, an accurate three-dimensional image of the target may be generated. In some implementations of the invention, the video subsystem and the lidar subsystem may be aligned with one another by mapping certain independent measurements of various features on the target made by each of the subsystems to one another. In some implementations, various components of the lidar subsystem (e.g., scanning mirrors, etc.) are aligned with one another by mapping the independent measurements of various features obtained by each of the components to one another.

These implementations, their features and other aspects of the invention are described in further detail below.

DETAILED DESCRIPTION

Figure 1:
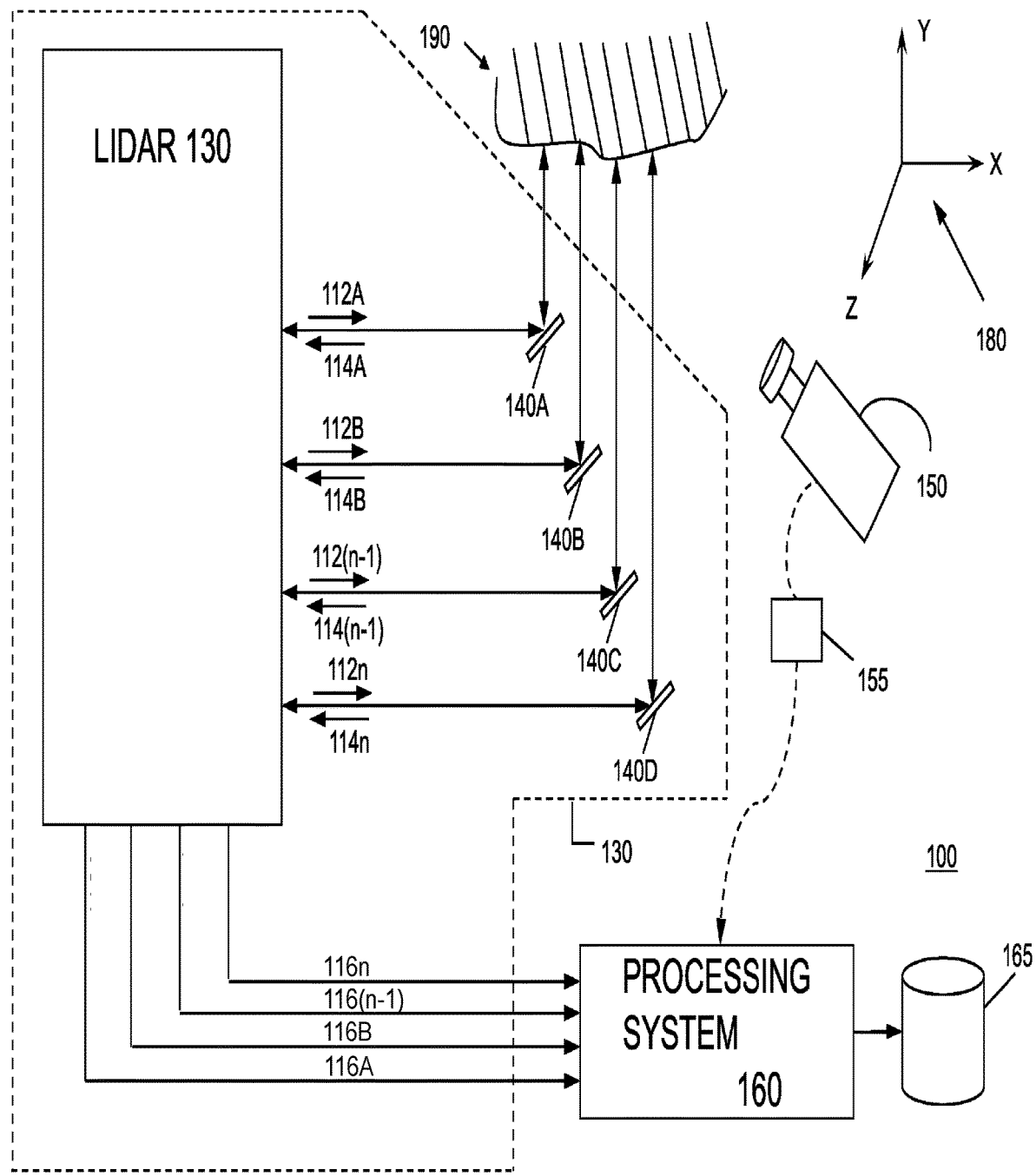
FIG. 1 illustrates a combined lidar and video camera system according to various implementations of the invention.

FIG. 1 illustrates a combined lidar and video camera system 100 (or three-dimensional measurement system 100) according to various implementations of the invention. Various implementations of the invention utilize synergies between lidar measurements and video images to resolve six degrees of freedom for motion of a target to a degree not otherwise possible with either a lidar or video camera alone.

Combined system 100 includes a lidar subsystem 130, a video subsystem 150, and a processing system 160. As illustrated, lidar subsystem 130 includes two or more lidar beam outputs 112 (illustrated as a beam 112A, a beam 112B, a beam 112(n−1), and a beam 112n); two or more reflected beam inputs 114 each corresponding to one of beams 112 (illustrated as a reflected beam 114A, a reflected beam 114B, a reflected beam 114(n−1), and a reflected beam 114n); two or more lidar outputs 116 each associated with a pair of beam 112/reflected beam 114 (illustrated as a lidar output 116A associated with beam 112A/reflected beam 114A, a lidar output 116B associated with beam 112B/reflected beam 114B, a lidar output 116(n−1) associated with beam 112(n−1)/reflected beam 114(n−1), and a lidar output 116n associated with beam 112n/reflected beam 114n).

In some implementations of the invention, beam steering mechanism 140 may be employed to steer one or more beams 112 toward target 190. In some implementations of the invention, beam steering mechanism 140 may include individual steering mechanisms, such as a steering mechanism 140A, a steering mechanism 140B, a steering mechanism 140C, and a steering mechanism 140D, each of which independently steers a beam 112 toward target 190. In some implementations of the invention, one beam steering mechanism 140 may independently steer pairs or groups of beams 112 toward target 190.

In some implementations of the invention, beam steering mechanism 140 may include one or more mirrors, each of which may or may not be separately controlled, each mirror steering one or more beams 112 toward target 190. In some implementations of the invention, beam steering mechanism 140 may directly steer an optical fiber of beam 112 without use of a mirror. In some implementations of the invention, beam steering mechanism 140 may be controlled to steer beams 112 in azimuth and/or elevation. Various techniques may be used by beam steering mechanism 140 to steer beam(s) 112 toward target 190 as would be appreciated.

In some implementations of the invention, beam steering mechanism 140 may be used to control both an azimuth angle and an elevation angle of two beams 112 toward the target. By controlling both the azimuth angle and the elevation angle, the two beams 112 may be used to scan a volume for potential targets or track particular targets such as target 190. Other scanning mechanisms may be employed as would be apparent. In some implementations of the invention, the two beams 112 may be offset from one another. In some implementations of the invention, the two beams 112 may be offset vertically (e.g., in elevation) or horizontally (e.g., in azimuth) from one another by a predetermined offset and/or a predetermined angle, either of which may be adjustable or controlled.

In some implementations of the invention, beam steering mechanism 140 may be used to control both an azimuth angle and an elevation angle of four beams 112 toward the target. In some implementations, the four beams 112 may be arranged with horizontal and vertical separations. In some implementations, the four beams may be arranged so as to form at least two orthogonal separations. In some implementations, the four beams may be arranged in a rectangular pattern, with pairs of beams 112 offset from one another vertically and horizontally. In some implementations, the four beams may be arranged in other patterns, with pairs of beams 112 offset from one another. The separations of the four beams 112 may be predetermined offsets and/or predetermined angles, which may be fixed, adjustable and/or controlled.

A certain portion of each beam 112 may be reflected back from target 190 to lidar subsystem 130 as reflected beam 114. In some implementations of the invention and as illustrated in FIG. 1, reflected beam 114 follows the same optical path (though in reverse) as beam 112. In some implementations of the invention, a separate optical path may be provided in lidar subsystem 130 or in combined system 100 to accommodate reflected beam 114.

In some implementations of the invention, lidar subsystem 130 receives a reflected beam 114 corresponding to each beam 112, processes reflected beam 114, and outputs lidar output 116 to processing system 160.

Combined system 100 also includes video subsystem 150. Video subsystem 150 may include a video camera for capturing two dimensional images 155 of target 190. Various video cameras may be used as would be apparent. In some implementations of the invention, the video camera may output images 155 as pixels at a particular resolution and at a particular image or frame rate. Video images 155 captured by video subsystem 150 are forwarded to processing system 160. In some implementations of the invention, lidar subsystem 130 and video subsystem 150 are offset from one another in terms of position and orientation. In particular, lidar measurements typically correspond to three dimensions (e.g., x, y, and z) whereas video images typically correspond to two dimensions (e.g., x and y). Various implementations of invention calibrate lidar subsystem 130 with video subsystem 150 to ensure that data provided by each system refers to the same location in a given coordinate system as would be apparent.

Combined system 110 may include one or more optional video subsystems (not otherwise illustrated) for capturing additional two-dimensional images 155 of target 190 from different positions, perspectives or angles as would be apparent.

In some implementations of the invention, processing system 160 receives lidar outputs 116 from lidar subsystem 130 and images 155 from video subsystem 150 and stores them in a memory or other storage device 165 for subsequent processing. Processing system 160 processes lidar outputs 116 and images 155 to generate a three-dimensional image of target 190. In some implementations of the invention, processing system 160 determines a trajectory of target 190 from a combination of lidar outputs 116 and images 155 and uses the trajectory to generate a motion stabilized three-dimensional image of target 190.

In some implementations of the invention, lidar subsystem 130 may include, for each of beams 112, a dual frequency, chirped coherent laser radar system capable of unambiguously and simultaneously measuring both range and Doppler velocity of a point on target 190. Such a laser radar system is described in U.S. Pat. No. 7,251,824, entitled "Chirped Coherent Laser Radar System and Method," (the "Chirped Lidar Specification"), which is incorporated herein by reference in its entirety. For purposes of clarity, a "beam" referenced in the Chirped Lidar Specification is not the same as a "beam" referred to in this description. More particularly, in the Chirped Lidar Specification, two beams are described as output from the laser radar system, namely a first beam having a first frequency (chirped or otherwise) and a second beam having a second frequency (chirped or otherwise) that are simultaneously coincident on a point on a target to provide simultaneous measurements of both range and Doppler velocity of the point on the target. For purposes of simplicity and clarity, a singular "beam" as discussed herein may refer to the combined first and second beams output from the laser radar system described in the Chirped Lidar Specification. The individual beams discussed in the Chirped Lidar Specification are referred to herein henceforth as "signals." Nonetheless, various implementations of the invention may employ beams other than those described in the Chirped Lidar Specification provided these beams provide simultaneous range and Doppler velocity measurements at points on the target.

Figure 2:
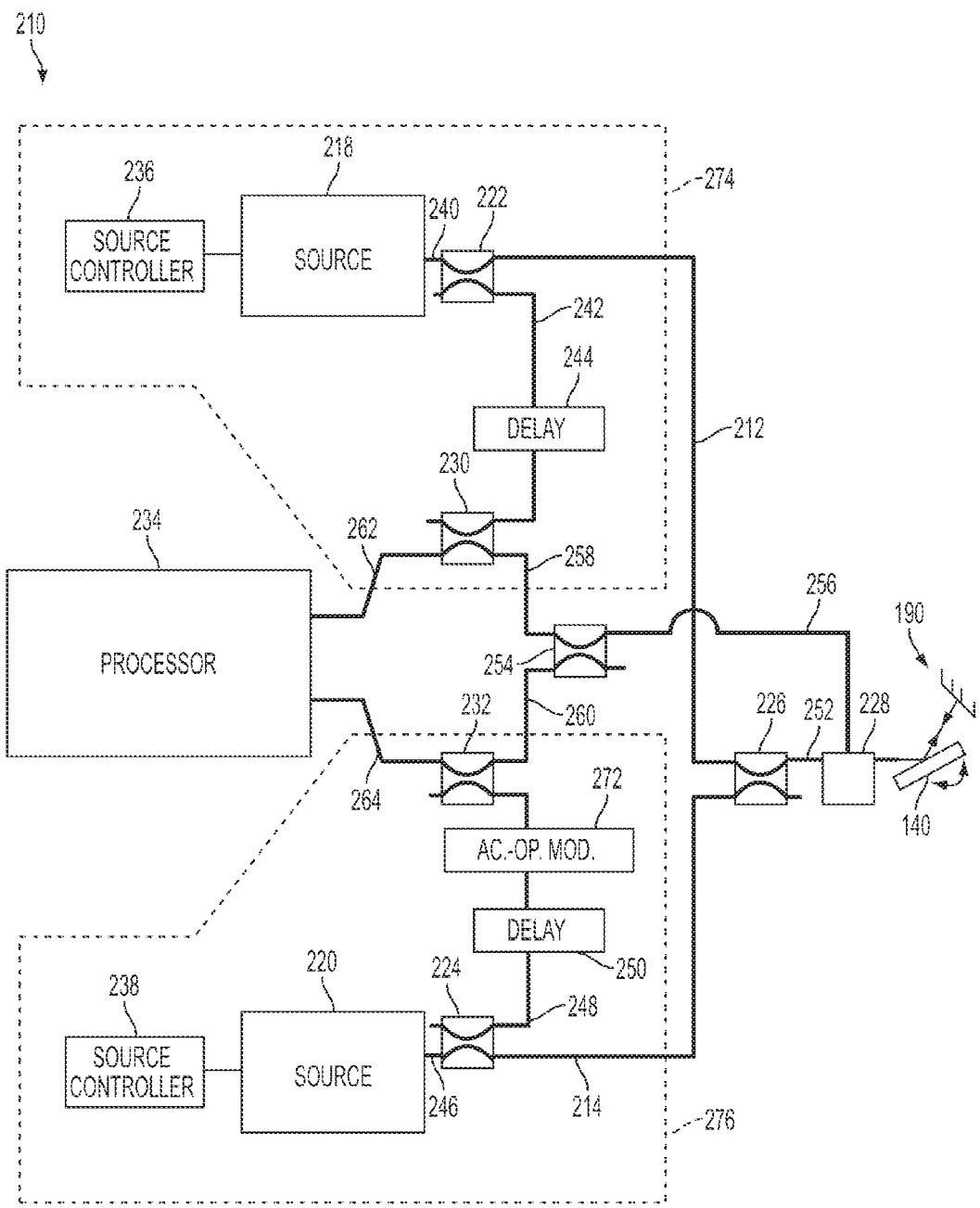
FIG. 2 illustrates a lidar (i.e., laser radar) according to various implementations of the invention.

FIG. 2 illustrates a lidar 210 that may be used to generate and process beam 112 and reflected beam 114 to provide lidar output 116 according to various implementations of the invention. Each lidar 210 unambiguously determines a range and Doppler velocity of a point on target 190 relative to lidar 210. Lidar 210 includes a first frequency lidar subsection 274 and a second frequency lidar subsection 276. First frequency lidar subsection 274 emits a first frequency target signal 212 toward target 190 and second frequency lidar subsection 276 emits a second frequency target signal 214 toward target 190. The frequencies of first target signal 212 and second target signal 214 may be chirped to create a dual chirp system.

First frequency lidar subsection 274 may include a laser source controller 236, a first laser source 218, a first optical coupler 222, a first signal delay 244, a first local oscillator optical coupler 230, and/or other components. Second frequency lidar subsection 276 may include a laser source controller 238, a second laser source 220, a second optical coupler 224, a second signal delay 250, a second local oscillator optical coupler 232 and/or other components.

First frequency lidar subsection 274 generates first target signal 212 and a first reference signal 242. First target signal 212 and first reference signal 242 may be generated by first laser source 218 at a first frequency that may be modulated at a first chirp rate. First target signal 212 may be directed toward a measurement point on target 190 either independently or combined with second target signal 214. First frequency lidar subsection 274 may combine target signal 256 that was reflected from target 190 with first reference signal 242, which is directed over a path with a known or otherwise fixed path length, to result in a combined first target signal 262.

Second frequency lidar subsection 276 may be collocated and fixed with respect to first frequency lidar subsection 274 (i.e., within lidar 210). More particularly, the relevant optical components for transmitting and receiving the respective laser signals may be collocated and fixed. Second frequency lidar subsection 276 may generate second target signal 214 and a second reference signal 248. Second target signal 214 and second reference signal 248 may be generated by second laser source 220 at a second frequency that may be modulated at a second chirp rate. In some implementations of the invention, the second chirp rate is different from the first chirp rate.

Second target signal 214 may be directed toward the same measurement point on target 190 as first target beam 212. Second frequency lidar subsection 276 may combine one portion of target signal 256 that was reflected from target 190 with second reference signal 248, which is directed over a path with a known or otherwise fixed path length, to result in a combined second target signal 264.

Processor 234 receives combined first target signal 262 and combined second target signal 264 and measures a beat frequency caused by a difference in path length between each of the reflected target signals and its corresponding reference signal, and by any Doppler frequency created by target motion relative to lidar 210. The beat frequencies may then be combined linearly to generate unambiguous determinations of range and Doppler velocity of target 190 as set forth in the Chirped Lidar Specification. In some implementations, processor 234 provides the range and Doppler velocity measurements to processing system 160. In some implementations, processor 234 is combined with processing system 160; in such implementations, processing system 160 receives combined first target signal 262 and combined second target signal 264 and uses them to determine range and Doppler velocity.

As described, each beam 112 provides simultaneous measurements of range and Doppler velocity of a point on target 190 relative to lidar 210. According to various implementations of the invention, various numbers of beams 112 may be used to provide these measurements of target 190. In some implementations of the invention, two or more beams 112 may be used. In some implementations of the invention, three or more beams 112 may be used. In some implementations of the invention four or more beams 112 may be used. In some implementations of the invention, five or more beams 112 may be used.

In various implementations of the invention, beams 112 may be used to gather measurements for different purposes. For example, in some implementations of the invention, a particular beam 112 may be used for purposes of scanning a volume including target 190. In some implementations of the invention, multiple beams 112 may be used to accomplish such scanning. In some implementations of the invention, a particular beam 112 may be used to monitor a particular feature or position on target 190. In some implementations of the invention, multiple beams 112 may be used to independently monitor one or more features and/or positions on target 190. In some implementations of the invention, one or more beams 112 may be used to scan target 190 while one or more other beams 112 may be used to monitor one or more features and/or positions on target 190.

In some implementations of the invention, one or more beams 112 may scan target 190 to obtain a three dimensional image of target 190 while one or more other beams 112 may be monitoring one or more features and/or positions on target 190. In some implementations of the invention, after a three dimensional image of target 190 is obtained, one or more beams 112 may continue scanning target 190 to monitor and/or update the motion aspects of target 190 while one or more other beams 112 may monitor one or more features and/or positions on target 110.

In some implementations of the invention, measurements obtained via one or more beams 112 used to monitor and/or update the motion aspects of target 190 may be used to compensate measurements obtained via the one or more other beams 112 used to monitor one or more features and/or positions on target 190. In these implementations of the invention, the gross motion of target 190 may be removed from the measurements associated with various features and/or positions on target 190 to obtain fine motion of particular points or regions on target 190. In various implementations of the invention, fine motion of target 190 may include various vibrations, oscillations, or motion of certain positions on the surface of target 190 relative to, for example, a center of mass, a center of rotation, another position on the surface of target 190 or other position. In various implementations of the invention, fine motion of target 190 may include, for example, relative motion of various features such as eyes, eyelids, lips, mouth corners, facial muscles or nerves, nostrils, neck surfaces, etc. or other features of target 190.

In some implementations of the invention, based on the gross motion and/or the fine motion of target 190, one or more physiological functions and/or physical activities of target 190 may be monitored. For example, U.S. Pat. No. 7,507,203, entitled "System and Method for Remotely Monitoring Physiological Functions" describes various systems and methods for monitoring physiological functions and/or physical activities of an individual and is incorporated herein by reference in its entirety.

In some implementations of the invention, one or more beams 112 may be used to monitor one or more locations on an eyeball of target 190 and measure various position and motion aspects of the eyeball at the each of these locations. Co-pending U.S. patent application Ser. No. 11/610,867, entitled "System and Method for Tracking Eyeball Motion" describes various systems and methods for tracking the movement of an eyeball and is incorporated herein by reference in its entirety.

In some implementations of the invention, one or more beams 112 may be used to focus on various features or locations on a face of target 190 and measure various aspects of the face with respect to the features or locations on the face of target 190. For example, certain facial features or facial expressions may be monitored over a period of time to infer a mental state of target 190, to infer an intent of target 190, to infer a deception level of target 190 or to predict an event associated with target 190 (e.g., certain facial muscles may twitch just prior to a change in expression or prior to speech).

In some implementations of the invention, one or more beams 112 may be used to monitor one or more locations on a neck of target 190. The measured motion aspects of the neck of target 190 may be used to determine throat movement patterns, vocal cord vibrations, pulse rate, and/or respiration rate. In some implementations of the invention, one or more beams 112 may be used to monitor one or more locations on an upper lip of target 190 to detect and measure vibrations associated with speech of target 190. These vibrations may be used to substantially reproduce the speech of target 190.

In some implementations of the invention, one or more beams 112 may serve one purpose during a first period or mode of operation of combined system 100 and may switch to serve a different purpose during a second period or mode of operation of combined system 100. For example, in some implementations of the invention, multiple beams 112 may be used to measure various motion aspects of target 190 so that processing system 160 may determine or acquire a trajectory of target 190. Once the trajectory of target 190 is acquired, some of the multiple beams 112 may switch to monitoring certain other aspects or features of target 190 while other ones of the multiple beams 112 measure motion aspects of target 190 so that its trajectory can be maintained.

In some implementations of the invention, five beams 112 scan target 190 to obtain a three dimensional image of target 190. In these implementations, four of these beams 112 each scan a portion of target 190 (using various scanning patterns as described in further detail below) while a fifth beam 112 performs an "overscan" of target 190. The overscan may be a circular, oval, elliptical or similar round scan pattern or a rectangular, square, diamond or similar scan pattern or other scan pattern useful for capturing multiple measurements of various points on target 190 (or at least points within close proximity to one another) within relatively short time intervals. These multiple measurements may correspond to other measurements made by the fifth beam 112 (i.e., multiple visits to the same point by the fifth beam 112) or to measurements made by one or more of the other four beams 112 (i.e., visits to the same point by the fifth beam and one or more of the other four beams 112). In some implementations, the pattern of the overscan may be selected to provide additional vertical and/or horizontal spread between measurements of target 190. Both the multiple measurements and additional spread may be used to improve estimates of the motion of target 190. Use of the fifth beam 112 to overscan target 190 may occur during each of the different modes of operation referred to above.

In some implementations of the invention, once the trajectory of target 190 is satisfactorily acquired, one or more beams 112 may provide measurements useful for maintaining the trajectory of target 190 as well as monitor other aspects of features of target 190. In such implementations, other beams 112 may be used to scan for other targets in the scanning volume.

As illustrated in FIG. 1, a target coordinate frame 180 may be used to express various measurements associated with target 190. Various coordinate frames may be used as would be appreciated. In some implementations of the invention, various ones of the subsystems 130, 150 may express aspects of target 190 in coordinate frames other than target coordinate frame 180 as would be appreciated. For example, in some implementations of the invention, a spherical coordinate frame (e.g., azimuth, elevation, range) may be used to express measurements obtained via lidar subsystem 130. Also for example, in some implementations of the invention, a two dimensional pixel-based coordinate frame may be used to express images 155 obtained via video subsystem 150. Various implementations of the invention may use one or more of these coordinate frames, or other coordinate frames, at various stages of processing as will be appreciated.

As would be appreciated, in some implementations of the invention, various coordinate transformations may be required to transform measurements from lidar subsystem 130, which may be expressed in a spherical coordinates with reference to lidar subsystem 130 (sometimes referred to as a lidar measurement space), to the motion aspects of target 190, which may be expressed in Cartesian coordinates with reference to target 190 (sometimes referred to as target space). Likewise, various coordinate transformations may be required to transform measurements from video subsystem 150, which may be expressed in Cartesian or pixel coordinates with reference to video subsystem 150 (sometimes referred to as video measurement space), to the motion aspects of target 190. In addition, measurements from combined system 100 may be transformed into coordinate frames associated with external measurement systems such as auxiliary video, infrared, hyperspectral, multispectral or other auxiliary imaging systems. Coordinate transformations are generally well known.

As would be appreciated, in some implementations of the invention, various coordinate transformations may be required to transform measurements from lidar subsystem 130 and/or video subsystem 150 to account for differences in position and/or orientation of each such subsystem 130, 150 as would be apparent.

Figure 3:
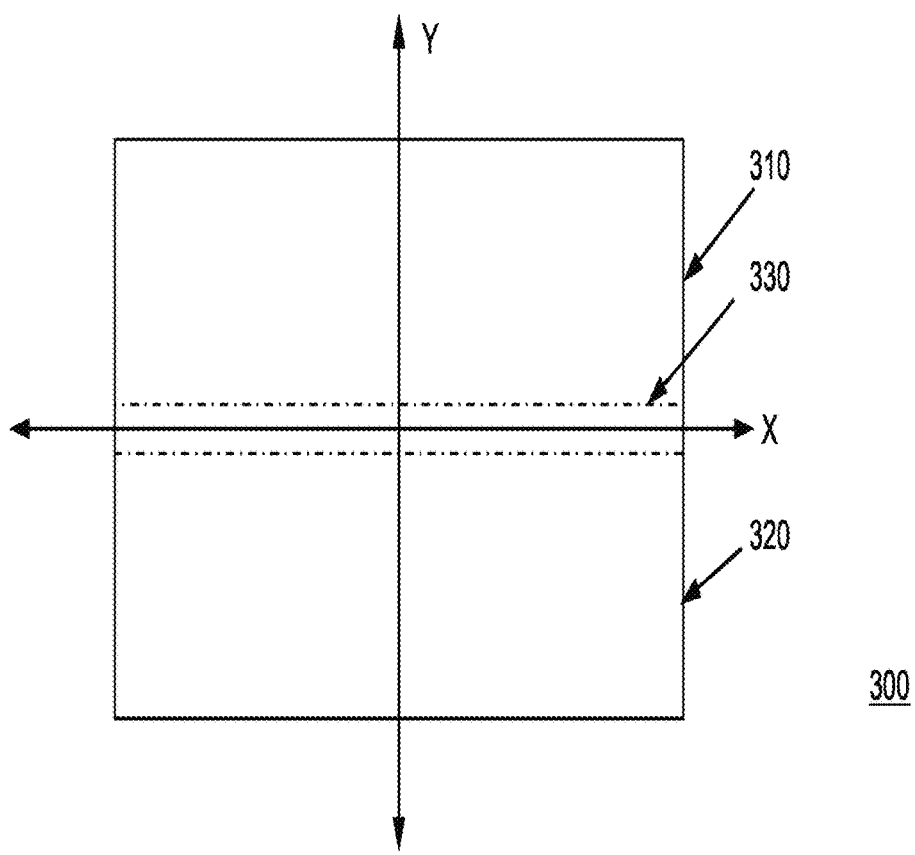
FIG. 3 illustrates a scan pattern for a lidar subsystem that employs two lidar beams according to various implementations of the invention.

FIG. 3 illustrates a scan pattern 300 which may be used to scan a volume for targets 190 according to various implementations of the invention. Scan pattern 300 includes a first scan pattern section 310 and a second scan pattern section 320. First scan pattern section 310 may correspond to a scan pattern of a first beam 112 (e.g., beam 112A) that may be used to scan the volume (or portion thereof). Second scan pattern section 320 may correspond to a scan pattern of a second beam 112 (e.g., beam 112B) that may be used to scan the volume (or portion thereof).

As illustrated in FIG. 3, the first beam 112 scans an upper region of scan pattern 300 whereas the second beam 112 scans a lower region of scan pattern 300. In some implementations of the invention, the scan pattern sections 310, 320 may include an overlap region 330. Overlap region 330 may be used to align or "stitch together" first scan pattern section 310 with second scan pattern section 320. In some implementations of the invention, scan patterns 310, 320 do not overlap to form overlap region 330 (not otherwise illustrated).

In implementations of the invention where lidar subsystem 130 employs a vertically displaced scan pattern 300 (such as that illustrated in FIG. 3), first beam 112 is displaced vertically (i.e., by some vertical distance, angle of elevation, or other vertical displacement) from a second beam 112. In this way, the pair of beams 112 may be scanned with a known or otherwise determinable vertical displacement.

While scan pattern 300 is illustrated as having vertically displaced scan pattern sections 310, 320 in FIG. 3, in some implementations of the invention, scan pattern may have horizontally displaced scan sections. In implementations of the invention where lidar subsystem 130 employs a horizontally displaced scan pattern (not otherwise illustrated), first beam 112 is displaced horizontally (i.e., by some horizontal distance, angle of azimuth, or other horizontal displacement) from second beam 112. In this way, the pair of beams 112 may be scanned with a known or otherwise determinable horizontal displacement.

While FIG. 3 illustrates a scan pattern 300 with two vertically displaced scan pattern sections 310, 320, various numbers of beams may be stacked to create a corresponding number of scan pattern sections as would be appreciated. For example, three beams may be configured with either vertical displacements or horizontal displacements to provide three scan pattern sections. Other numbers of beams may be used either horizontally or vertically as would be appreciated.

Figure 4:
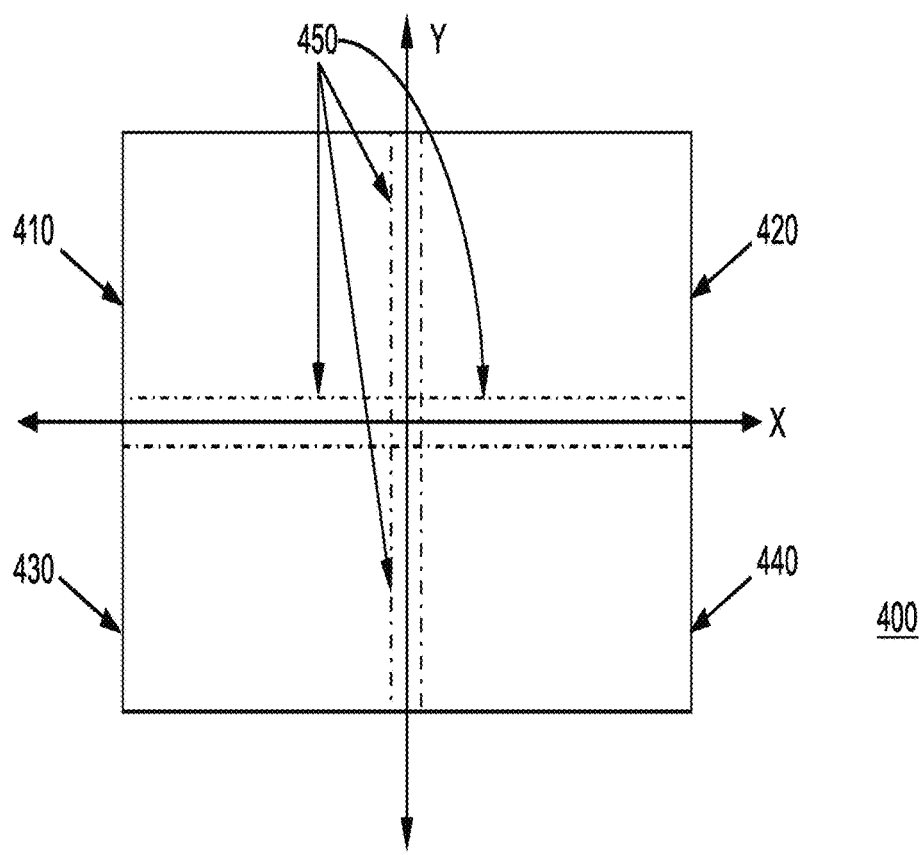
FIG. 4 illustrates a scan pattern for a lidar subsystem that employs four lidar beams according to various implementations of the invention.

FIG. 4 illustrates a scan pattern 400 for lidar subsystem 130 that employs four beams 112 according to various implementations of the invention. As illustrated in FIG. 4, lidar subsystem 130 includes four beams 112 arranged to scan a scan pattern 400. Scan pattern 400 may be achieved by having a first pair of beams 112 displaced horizontally from one another and a second pair of beams 112 displaced horizontally from one another and vertically from the first pair of beam 112, thereby forming a rectangular scanning arrangement. Other scanning geometries may be used as would be apparent. Scan pattern 400 may be achieved by controlling the beams independently from one another, as pairs (either horizontally or vertically), or collectively, via beam scanning mechanism(s) 140.

Scan pattern 400 includes a first scan pattern section 410, a second scan pattern section 420, a third scan pattern section 430, and a fourth scan pattern section 440. In some implementations of the invention, each of the respective scan pattern sections 410, 420, 430, 440 may overlap an adjacent scan pattern portion by some amount (illustrated collectively in FIG. 4 as overlap regions 450). For example, in some implementations of the invention, scan pattern 400 includes an overlap region 450 between first scan pattern section 410 and third scan pattern section 430. Likewise, an overlap region 450 exists between a first scan pattern section 410 and a second scan section 420. In some implementations of the invention, various ones of these overlap regions 450 may not occur or otherwise be utilized. In some implementations of the invention, for example, only vertical overlap regions 450 may occur or be utilized. In some implementations of the invention, only horizontal overlap regions 450 may occur or be utilized. In some implementations of the invention, no overlap regions 450 may occur or be utilized. In some implementations of the invention, other combinations of overlap regions 450 may be used.

As illustrated in FIG. 3 and FIG. 4, the use by lidar subsystem 130 of multiple beams 112 may increase a rate at which a particular volume (or specific targets within the volume) may be scanned. For example, a given volume may be scanned twice as fast using two beams 112 as opposed to scanning the same volume with one beam 112. Similarly, a given volume may be scanned twice as fast using four beams 112 as opposed to scanning the same volume with two beams 112, and four times as fast as scanning the same volume with one beam 112. In addition, multiple beams 112 may be used to measure or estimate various parameters associated with the motion of target 190 as will be discussed in more detail below.

According to various implementations of the invention, particular scan patterns (and their corresponding beam configurations) may be used to provide measurements and/or estimates of motion aspects of target 190. As described above, each beam 112 may be used to simultaneously provide a range measurement and a Doppler velocity measurement at each point scanned.

In some implementations of the invention, for each beam 112, a point scanned by that beam 112 may be described by an azimuth angle, an elevation angle, and a time. Each beam 112 provides a range measurement and a Doppler velocity measurement at that point and time. In some implementations of the invention, each point scanned by beam 112 may be expressed as an azimuth angle, an elevation angle, a range measurement, a Doppler velocity measurement, and a time. In some implementations of the invention, each point scanned by beam 112 may be expressed in Cartesian coordinates as a position (x, y, z), a Doppler velocity and a time.

According to various implementations of the invention, measurements from lidar subsystem 130 (i.e., lidar outputs 116) and measurements from video subsystem 150 (frames 155) may be used to measure and/or estimate various orientation and/or motion aspects of target 190. These orientation and/or motion aspects of target 190 may include position, velocity, acceleration, angular position, angular velocity, angular acceleration, etc. As these orientation and/or motion aspects are measured and/or estimated, a trajectory of target 190 may be determined or otherwise approximated. In some implementations of the invention, target 190 may be considered a rigid body over a given time interval and its motion may be expressed as translational velocity components expressed in three dimensions as $v_x^{trans}$, $v_y^{trans}$, and $v_z^{trans}$, and angular velocity components expressed in three dimensions as $\omega_x$, $\omega_y$, and $\omega_z$ over the given time interval. Collectively, these translational velocities and angular velocities correspond to six degrees of freedom of motion for target 190 over the particular time interval. In some implementations of the invention, measurements and/or estimates of these six components may be used to express a trajectory for target 190. In some implementations of the invention, measurements and/or estimates of these six components may be used to merge the three-dimensional image of target 190 obtained from lidar subsystem 130 with the two-dimensional images of target 190 obtained from video subsystem 150 to generate three-dimensional video images of target 190.

In some implementations of the invention, the instantaneous velocity component $v_z(t)$ of a point on target 190 may be calculated based on the range measurement, the Doppler velocity measurement, the azimuth angle and the elevation angle from lidar subsystem 130 as would be apparent.

Figure 5:
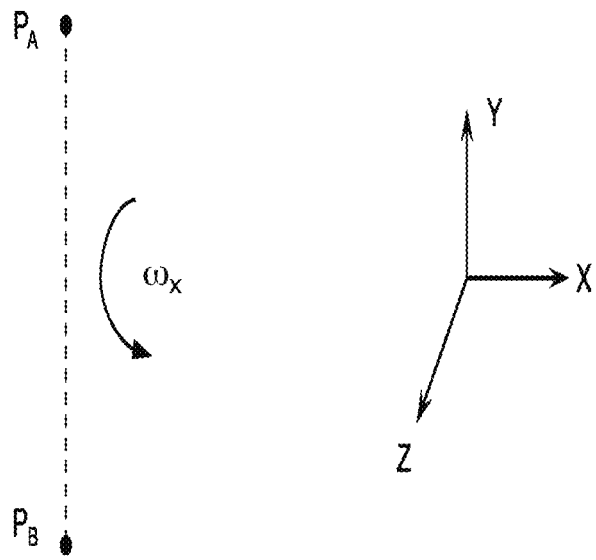
FIG. 5 illustrates a relationship between points acquired from the lidar subsystem from separate beams at substantially the same instance of time that may be used to estimate an x-component of angular velocity of a target according to various implementations of the invention.

Lidar subsystem 130 may be used to measure and/or estimate translational velocity $v_z^{trans}$ and two angular velocities of target 190, namely $\omega_x$ and $\omega_y$. For example, FIG. 5 illustrates an exemplary relationship between points with corresponding measurements from two beams 112 that may be used to estimate x and y components of angular velocity of target 190 according to various implementations of the invention. More particularly, and generally speaking, as illustrated in FIG. 5, in implementations where beams 112 are displaced from one another along the y-axis, a local velocity along the z-axis of point $P_A$ determined via a first beam 112, a velocity of point $P_B$ determined via a second beam 112, and a distance between $P_A$ and $P_B$ may be used to estimate an angular velocity of these points about the x-axis (referred to herein as $\omega_x$) as would be appreciated. In some implementations of the invention, these measurements may be used to provide an initial estimate of $\omega_x$.

Figure 6:
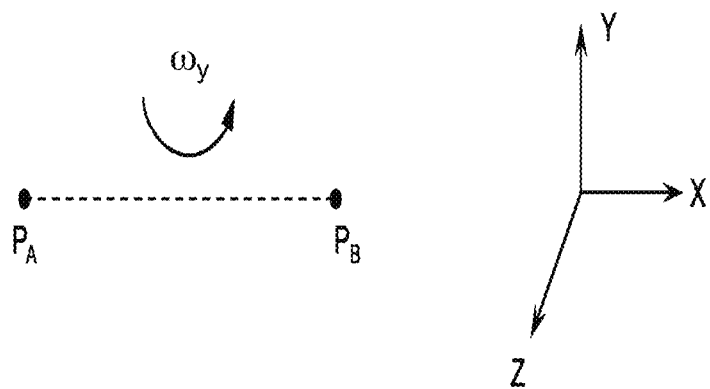
FIG. 6 illustrates a relationship between points acquired from the lidar subsystem from separate beams at substantially the same instance of time that may be used to estimate a y-component of angular velocity of a target according to various implementations of the invention.

FIG. 6 illustrates another exemplary relationship between points with corresponding measurements from two beams 112 that may be used to estimate an angular velocity according to various implementations of the invention. More particularly, as illustrated in FIG. 6, in implementations were beams 112 are displaced from one another on target 190 along the x-axis, a velocity of point $P_A$ determined via a first beam 112, a velocity of point $P_B$ determined by a second beam 112, and a distance between $P_A$ and $P_B$ on target 190 along the x-axis may be used to estimate an angular velocity of these points about the y-axis (referred to herein as $\omega_y$). In some implementations of the invention, these measurements may be used to provide an initial estimate of $\omega_y$.

FIG. 5 and FIG. 6 illustrate implementations of the invention where two beams 112 are disposed from one another along a vertical axis or a horizontal axis, respectively, and the corresponding range (which may be expressed in three-dimensional coordinates x, y, and z) and Doppler velocity at each point are measured at substantially the same time. In implementations of the invention that employ beams 112 along a single axis (not otherwise illustrated), an angular velocity may be estimated based on Doppler velocities measured at different points at different times along the single axis. As would be appreciated, better estimates of angular velocity may obtained using: 1) measurements at points at the extents of target 190 (i.e., at larger distances from one another), and 2) measurements taken within the smallest time interval (so as to minimize any effects due to acceleration).

FIG. 5 and FIG. 6 illustrate conceptual estimation of the angular velocities about different axes, namely the x-axis and the y-axis. In general terms, where a first beam 112 is displaced on target 190 along a first axis from a second beam 112, an angular velocity about a second axis orthogonal to the first axis may be determined from the velocities along a third axis orthogonal to both the first and second axes at each of the respective points.

In some implementations of the invention, where two beams are displaced along the y-axis from one another (i.e., displaced vertically) and scanned horizontally with vertical separation between scans, estimates of both $\omega_x$ and $\omega_y$ may be made. While simultaneous measurements along the x-axis are not available, they should be sufficiently close in time in various implementations to neglect acceleration effects. In some implementations of the invention where two beams 112 are displaced along the x-axis from one another and at least a third beam 112 is displaced along the y-axis from the pair of beams 112, estimates of $\omega_x$, $\omega_y$ and $v_z^{trans}$ may be made. In some implementations of the invention, estimates of both $\omega_x$, $\omega_y$ and $v_z^{trans}$ may be made using four beams 112 arranged in a rectangular fashion. In such implementations, the measurements obtained from the four beams 112 include more information than necessary to estimate $\omega_x$, $\omega_y$ and $v_z^{trans}$. This so-called "overdetermined system" may be used to improve the estimates of $\omega_x$, $\omega_y$ and $v_z^{trans}$ as would be appreciated.

As has been described, range and Doppler velocity measurements taken at various azimuth and elevation angles and at various points in time by lidar subsystem 130 may be used to estimate translational velocity $v_z^{trans}$ and estimate two angular velocities, namely, $\omega_x$ and $\omega_y$, for the rigid body undergoing ballistic motion.

In some implementations of the invention, $\omega_x$, $\omega_y$ and $v_z^{trans}$ may be determined at each measurement time from the measurements obtained at various points as would be appreciated. In some implementations of the invention, $\omega_x$, $\omega_y$ and $v_z^{trans}$ may be assumed to be constant over an particular interval of time. In some implementations of the invention, $\omega_x$, $\omega_y$ and $v_z^{trans}$ may be determined at various measurement times and subsequently averaged over a particular interval of time to provide estimates of $\omega_x$, $\omega_y$ and $v_z^{trans}$ for that particular interval of time as would be appreciated. In some implementations of the invention, the particular time interval may be fixed or variable depending, for example, on the motion aspects of target 190. In some implementations of the invention, a least squares estimator may be used to provide estimates of $\omega_x$, $\omega_y$ and $v_z^{trans}$ over a particular interval of time as would be appreciated. Estimates of $\omega_x$, $\omega_y$ and $v_z^{trans}$ may be obtained in other manners as would be appreciated.

Figure 7:
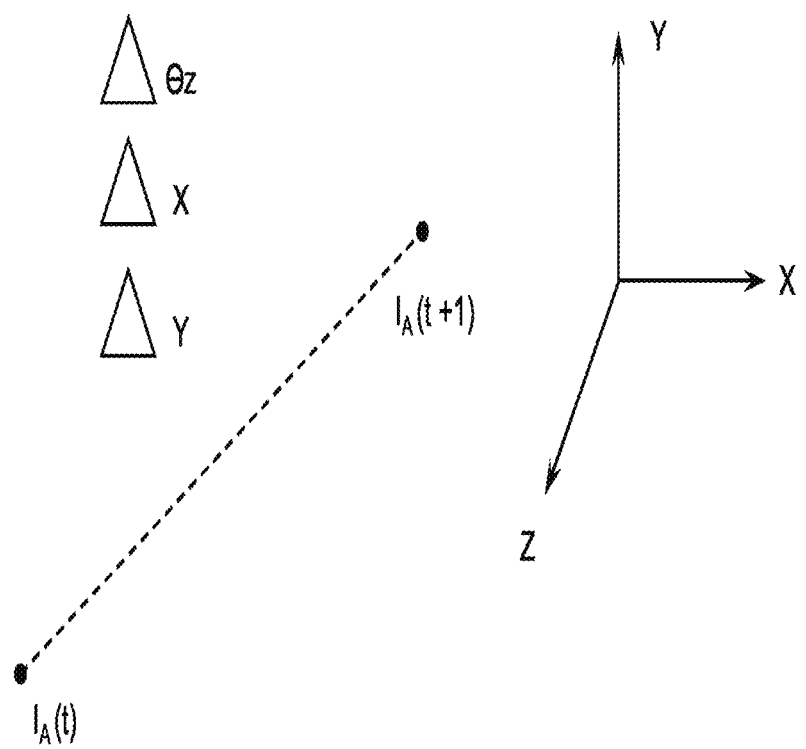
FIG. 7 illustrates a relationship between points acquired from the video subsystem that may be used to estimate a two-dimensional (e.g. x and y components) translational velocity and a z-component of angular velocity of a target according to various implementations of the invention.

In some implementations of the invention, images from video subsystem 150 may be used to estimate three other motion aspects of target 190, namely translational velocity components $v_x^{trans}$ and $v_y^{trans}$ and angular velocity component $\omega_z$ over a given interval of time. In some implementations of the invention, frames 155 captured by video subsystem 150 may be used to estimate x and y components of velocity for points on target 190 as it moves between frames 155. FIG. 7 illustrates a change in position of a particular point or feature $I_A$ between a frame 155 at time T and a frame 155 at subsequent time T+Δt.

In some implementations of the invention, this change of position is determined for each of at least two particular points or features in frame 155 (not otherwise illustrated). In some implementations of the invention, the change of position is determined for each of many points or features. In some implementations of the invention, translational velocity components $v_x^{trans}$ and $v_y^{trans}$, and angular velocity component $\omega_z$ of target 190 may be estimated based on a difference in position of a feature $I_A(T)$ and $I_A(T+\Delta t)$ and a difference in time, Δt, between the frames 155. These differences in position and time may be used to determine certain velocities of the feature, namely, $v_x^{feat}$ and $v_y^{feat}$ that may in turn be used to estimate the translational velocity components $v_x^{trans}$ and $v_y^{trans}$, and angular velocity component $\omega_z$ of target 190. Such estimations of velocity and angular velocity of features between image frames are generally understood as would be appreciated.

In some implementations of the invention, many features of target 190 are extracted from consecutive frames 155. The velocities $v_x^{feat}$ and $v_y^{feat}$ of these features over the time interval between consecutive frames 155 may be determined based on changes in position of each respective feature between the consecutive frames 155. A least squares estimator may be used to estimate the translational velocities $v_x^{trans}$ and $v_y^{trans}$, and the angular velocity $\omega_z$ from the position changes of each the extracted features.

In some implementations of the invention, a least squares estimator may use measurements from lidar subsystem 130 and the changes in position of the features in frames 155 from video subsystem 150 to estimate the translational velocities $v_x^{trans}$, $v_y^{trans}$ and $v_z^{trans}$ and the angular velocities $\omega_x$, $\omega_y$, and $\omega_z$ of target 190.

As has been described above, lidar subsystem 130 and video subsystem 150 may be used to estimate six components that may be used describe the motion of target 190. These components of motion may be collected over time to calculate a trajectory of target 190. This trajectory may then be used to compensate for motion of target 190 to obtain a motion stabilized three dimensional image of target 190. In various implementations of the invention, the trajectory of target 190 may be assumed to represent ballistic motion over various intervals of time. The more accurately trajectories of target 190 may be determined, the more accurately combined system 100 may adjust the measurements of target 190 to, for example, represent three dimensional images, or other aspects, of target 190.

In various implementations of the invention, a rate at which measurements are taken by lidar subsystem 130 is different from a rate at which frames 155 are captured by video subsystem 150. In some implementations of the invention, a rate at which measurements are taken by lidar subsystem 130 is substantially higher than a rate at which frames 155 are captured by video subsystem 150. In addition, because beams 112 are scanned through a scan volume by lidar subsystem 130, measurements at different points in the scan volume may be taken at different times from one another; whereas pixels in a given frame 155 are captured substantially simultaneously (within the context of video imaging). In some implementations of the invention, these time differences are resolved in order to provide a more accurate trajectory of target 190.

Figure 8:
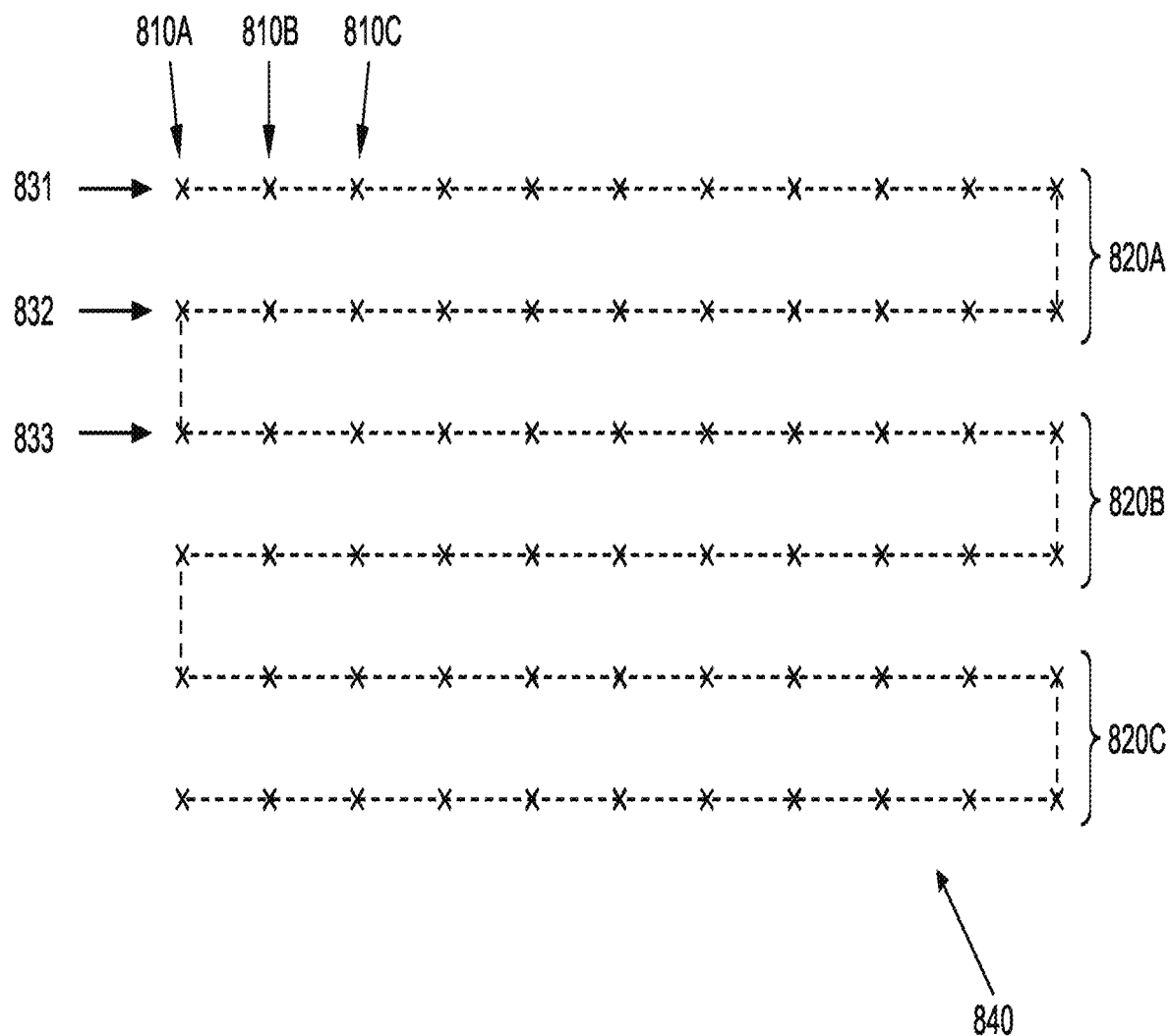
FIG. 8 illustrates a scan pattern of a lidar beam according to various implementations of the invention.

As illustrated in FIG. 8, in some implementations of the invention, a scan pattern 840 may be used to scan a volume for targets. For purposes of explanation, scan pattern 840 represents a pattern of measurements taken by a single beam. In some implementations multiple beams may be used, each with their corresponding scan pattern as would be apparent. As illustrated, scan pattern 840 includes individual points 810 measured left to right in azimuth at a first elevation 831, right to left in azimuth at a second elevation 832, left to right in azimuth at a third elevation 833, etc., until a particular scan volume is scanned. In some implementations, scan pattern 840 may be divided into intervals corresponding to various timing aspects associated with combined system 100. For example, in some implementations of the invention, scan pattern 840 may be divided into time intervals associated with a frame rate of video subsystem 150. In some implementations of the invention, scan pattern 840 may be divided into time intervals associated with scanning a particular elevation (i.e., an entire left-to-right or right-to-left scan). In some implementations of the invention, scan pattern 840 may be divided into time intervals associated with a roundtrip scan 820 (illustrated in FIG. 8 as a roundtrip scan 820A, a roundtrip scan 820B, and a roundtrip scan 820C) at one or more elevations (i.e., a left-to-right and a return right-to-left scan at either the same or different elevations). Similar timing aspects may be used in implementations that scan vertically in elevation (as opposed to horizontally in azimuth). Other timing aspects may be used as well.

As illustrated in FIG. 8 and again for purposes of explanation, each interval may include N points 810 which may in turn correspond to the number of points 810 in a single scan (e.g., 831, 832, 833, etc.) or in a roundtrip scan 820. A collection of points 810 for a particular interval is referred to herein as a sub-point cloud and a collection of points 810 for a complete scan pattern 840 is referred to herein as a point cloud. In some implementations of the invention, each point 810 corresponds to the lidar measurements of range and Doppler velocity at a particular azimuth, elevation, and a time at which the measurement was taken. In some implementations of the invention, each point 810 corresponds to the lidar measurements of range (expressed x, y, z coordinates) and Doppler velocity and a time at which the measurement was taken.

Figure 9:
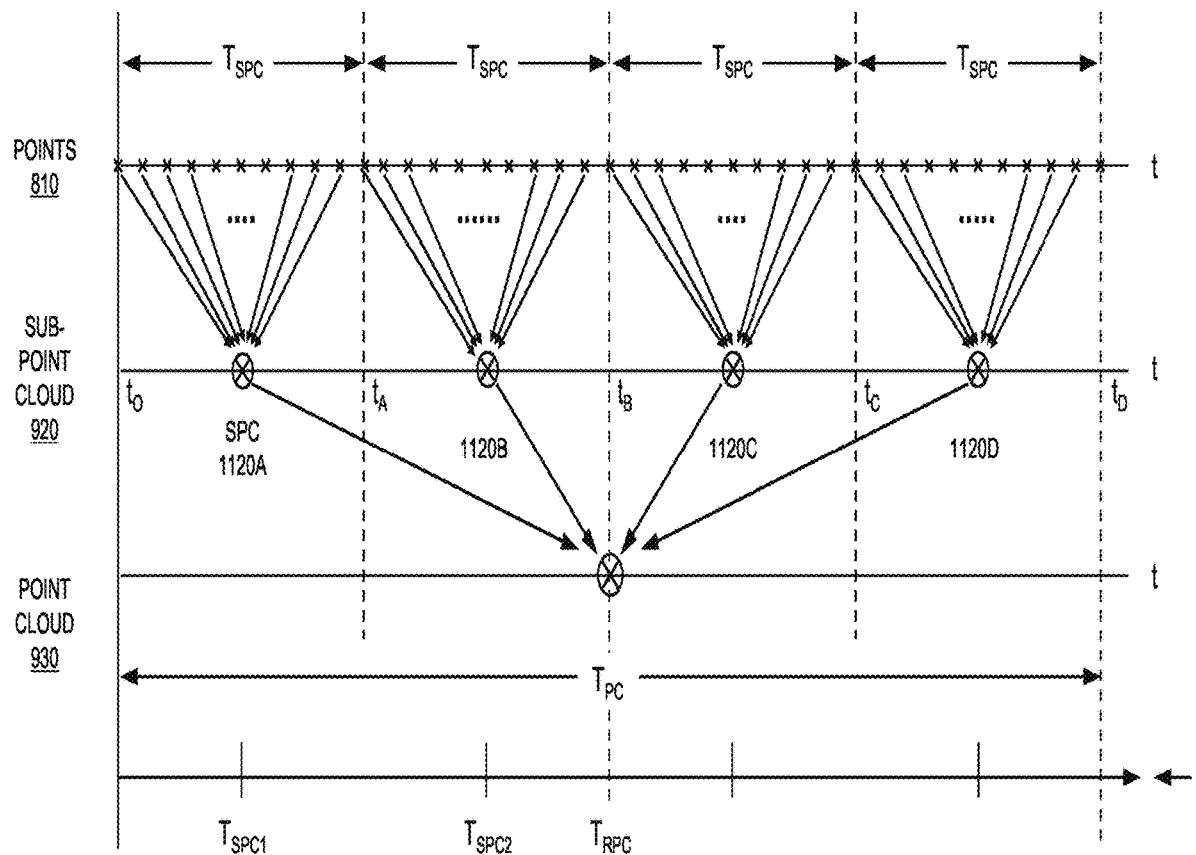
FIG. 9 illustrates a timing diagram which may be useful for describing various timing aspects associated with measurements from the lidar subsystem according to various implementations of the invention.

FIG. 9 illustrates a timing diagram 900 useful for describing various timing aspects associated with measurements from lidar subsystem 130 according to various implementations of the invention. Timing diagram 900 includes points 810 scanned by beam 112, sub-point clouds 920 formed from a plurality of points 810 collected over an interval corresponding to a respective sub-point cloud 920, and a point cloud 930 formed from a plurality of sub-point clouds 920 collected over the scan pattern. Timing diagram 900 may be extended to encompass points 810 scanned by multiple beams 112 as would be appreciated.

Each point 810 is scanned by a beam 112 and measurements associated with each point 810 are determined by lidar subsystem 130. In some implementations of the invention, points 810 are scanned via a scan pattern (or scan pattern section). The interval during which lidar subsystem 130 collects measurements for a particular sub-point cloud 920 may have a time duration referred to as $T_{SPC}$. In some implementations of the invention, the differences in timing of the measurements associated with individual points 810 in sub-point cloud 920 may be accommodated by using the motion aspects (e.g., translational velocities and angular velocities) for each point to adjust that point to a particular reference time for sub-point cloud 920 (e.g., $t_{RSPC}$). This process may be referred to as stabilizing the individual points 810 for the motion aspects of target 190.

In some implementations of the invention, the velocities may be assumed to be constant over the time interval (i.e., during the time duration $T_{SPC}$). In some implementations of the invention, the velocities may not be assumed to be constant during the period of the scan pattern and acceleration effects may need to be considered to adjust the measurements of points 810 to the reference time as would be appreciated. In some implementations of the invention, adjustments due to subdivision of the time interval may also need to be accommodated. As illustrated in FIG. 9, the reference time for each sub-point cloud 920 may be selected at the midpoint of the interval, although other reference times may be used.

In some implementations of the invention, similar adjustments may be made when combining sub-point clouds 920 into point clouds 930. More particularly, in some implementations of the invention, the differences in timing of the measurements associated with sub-point clouds 920 in point cloud 930 may be accommodated by using the motion aspects associated with the measurements.

In some implementations of the invention, the measurements associated with each sub-point cloud 920 that is merged into point cloud 930 are individually adjusted to a reference time associated with point cloud 930. In some implementations of the invention, the reference time corresponds to a frame time (e.g., time associated with a frame 155). In other implementations of the invention, the reference time correspond to an earliest of the measurement times of points 1110 in point cloud 930, a latest of the measurement times of points 1110 in point cloud 930, an average or midpoint of the measurement times of points 1110 in point cloud 930, or other reference time associated with point cloud 930.

Although not otherwise illustrated, in some implementations of the invention, similar adjustments may be made to combine point clouds 930 from individual beams 112 into aggregate point clouds at a particular reference time. In some implementations of the invention, this may be accomplished at the individual point level, the sub-point cloud level or the point cloud level as would be appreciated. For purposes of the remainder of this description, sub-point clouds 920 and point clouds 930 refer to the collection of points 810 at their respective reference times from each of beams 112 employed by lidar subsystem 130 to scan target 190.

In some implementations of the invention, motion aspects of target 190 may be assumed to be constant over various time intervals. For example, motion aspects of target 190 may be assumed to be constant over $T_{SPC}$ or other time duration. In some implementations of the invention, motion aspects of target 190 may be assumed to be constant over a given $T_{SPC}$, but not necessarily constant over $T_{PC}$. In some implementations of the invention, motion aspects of target 190 may be assumed to be constant over incremental portions of $T_{SPC}$, but not necessarily over the entire $T_{SPC}$. As a result, in some implementations of the invention, a trajectory of target 190 may be expressed as a piece-wise function of time, with each "piece" corresponding to the motion aspects of target 190 over each individual time interval.

In some implementations, timing adjustments to compensate for motion may be expressed as a transformation that accounts for the motion of a point from a first time to a second time. This transformation, when applied to measurements from, for example, lidar subsystem 130, may perform the timing adjustment from the measurement time associated with a particular point (or sub-point cloud or point cloud, etc.) to the desired reference time. Furthermore, when the measurements are expressed as vectors, this transformation may be expressed as a transformation matrix. Such transformation matrices and their properties are generally well known.

As would be appreciated, the transformation matrices may be readily used to place a position and orientation vector for a point at any time to a corresponding position and orientation vector for that point at any other time, either forwards or backwards in time, based on the motion of target 190. The transformation matrices may be applied to sub-point clouds, multiple sub-point clouds and point clouds as well. In some implementations, a transformation matrix may be determined for each interval (or subinterval) such that it may be used to adjust a point cloud expressed in one interval to a point cloud expressed in the next sequential interval. In these implementations, each interval has a transformation matrix associated therewith for adjusting the point clouds for the trajectory of target 190 to the next interval. In some implementations, a transformation matrix may be determined for each interval (or subinterval) such that it may be used to adjust a point cloud expressed in one interval to a point cloud expressed in the prior sequential interval. Using the transformation matrices for various intervals, a point cloud can be referenced to any time, either forward or backward.

Figure 10:
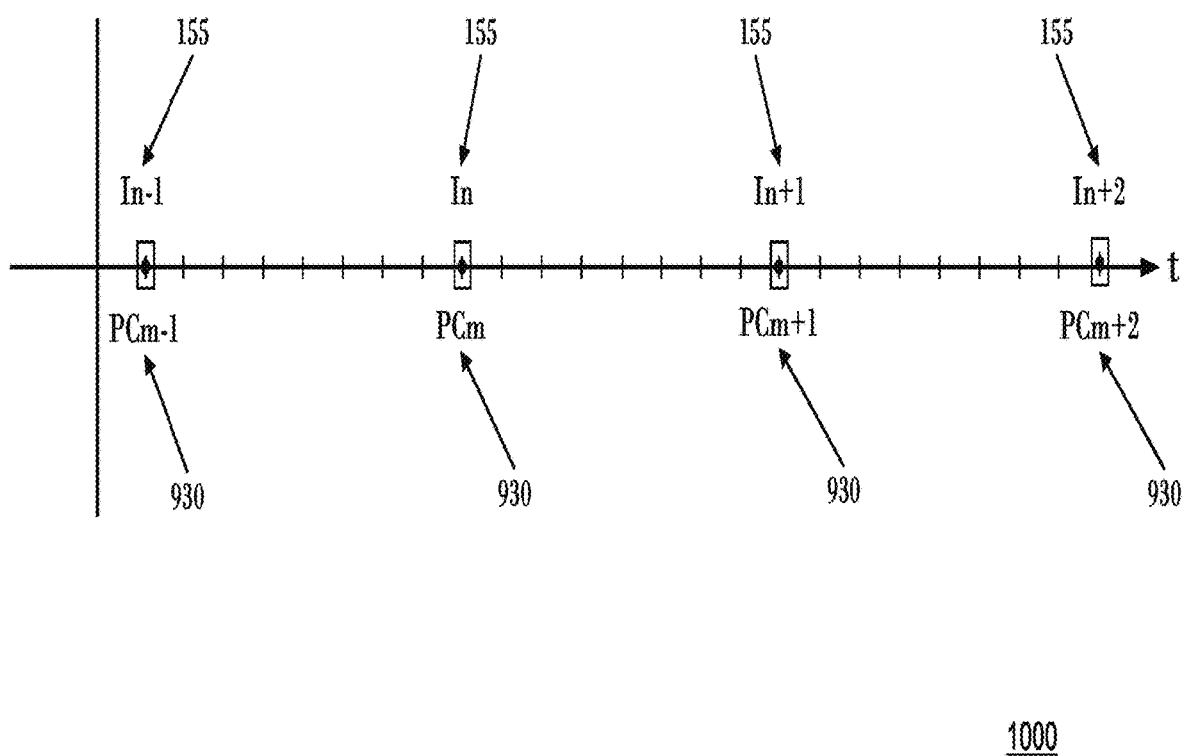
FIG. 10 illustrates a timing diagram which may be useful for describing various timing aspects associated with measurements from the lidar subsystem in relation to measurements from the video subsystem according to various implementations of the invention.

FIG. 10 illustrates a timing diagram 1000 useful for describing various timing aspects associated with measurements from lidar subsystem 130 in relation to measurements from video subsystem 150 according to various implementations of the invention. In some implementations of the invention, point cloud 930 may be referenced to the midpoint of a time interval between frames 155 or other time between frames 155. In some implementations of the invention, point cloud 930 may be referenced to a frame time corresponding to a particular frame 155. Point cloud 930 may be referenced in other manners relative to a particular frame 155 as would be appreciated.

As illustrated in FIG. 10, $PC_{m-1}$ is the expression of point cloud 930 referenced at the frame time of frame $I_{n-1}$; $PC_m$ is the expression of point cloud 930 referenced at the frame time of frame $I_n$; and $PC_{m+1}$ is the expression of point cloud 930 referenced at the frame time of frame $I_{n+1}$; and $PC_{m+2}$ is the expression of point cloud 930 referenced at the frame time of frame $I_{n+2}$. In some implementations, point cloud 930 may be referenced at other times in relation to the frames and frames times as would be apparent.

As described above, a transformation matrix $T_{i,j+1}$ may be determined to transform an expression of point cloud 930 at the $i^{th}$ frame time to an expression of point cloud 930 at the $(i+1)^{th}$ frame time. In reference to FIG. 10, a transformation matrix $T_{m-1,m}$ may be used to transform $PC_{m-1}$ to $PC_m$; a transformation matrix $T_{m,m+1}$ may be used to transform $PC_m$ to $PC_{m+1}$; and a transformation matrix $T_{m+1,m+2}$ may be used to transform $PC_{m+1}$ to $PC_{m+2}$. In this way, transformation matrices may be used to express point clouds 930 at different times corresponding to frames 155.

According to various implementations of the invention, the transformation matrices which are applied to point cloud 930 to express point cloud 930 from a first time to a second time are determined in different processing stages. Generally speaking, transformation matrices are directly related with six degree of motion parameters $\omega_x$, $\omega_y$, $\omega_z$, $v_x^{trans}$, $v_y^{trans}$ and $v_z^{trans}$ that may be calculated in two steps: first $\omega_x$, $\omega_y$, and $v_z^{trans}$ from lidar subsystem and second $v_x^{trans}$, $v_y^{trans}$ and $\omega_z$, from video subsystem.

Figure 11:
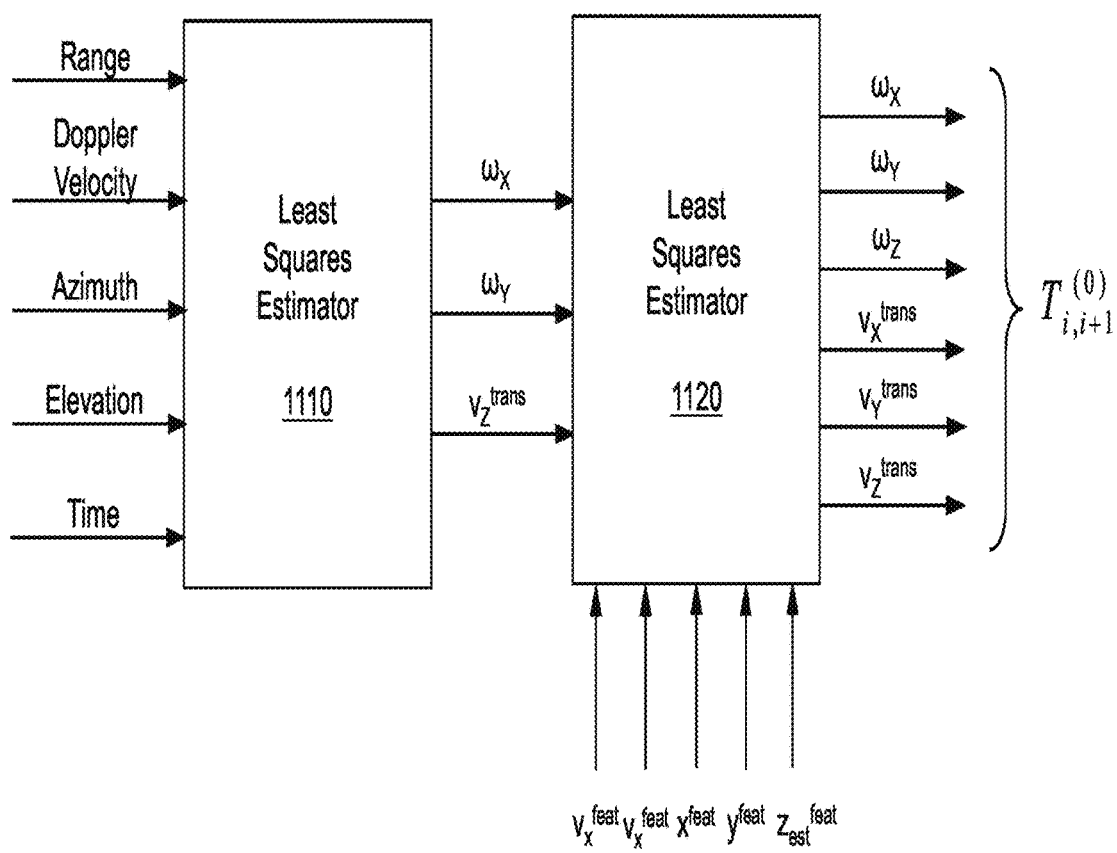
FIG. 11 illustrates a block diagram useful for processing lidar measurements and video images according to various implementations of the invention.

FIG. 11 illustrates a block diagram of a configuration of processing system 160 that may be used during a first phase of the first processing stage to estimate a trajectory of target 190 according to various implementations of the invention. In some implementations of the invention, during the first phase of the first stage, a series of initial transformation matrices (referred to herein as $T_{i,i+1}^{(0)}$) are determined from various estimates of the motion aspects of target 190. As illustrated, lidar subsystem 130 provides range, Doppler velocity, azimuth, elevation and time for at each point as input to a least squares estimator 1110 that is configured to estimate angular velocities $\omega_x$ and $\omega_y$ and translational velocity $v_z^{trans}$ over each of a series of time intervals. In some implementations of the invention, angular velocities $\omega_x$ and $\omega_y$ and translational velocity $v_z^{trans}$ are iteratively estimated by varying the size of the time intervals (or breaking the time intervals into subintervals) as discussed above until any residual errors from least squares estimator 1110 for each particular time interval reach acceptable levels as would be apparent. This process may be repeated for each successive time interval during the time measurements of target 190 are taken by lidar subsystem 130.

Assuming that target 190 can be represented over a given time interval as a rigid body (i.e., points on the surface of target 190 remain fixed with respect to one another) undergoing ballistic motion (i.e., constant velocity with no acceleration), an instantaneous velocity of any given point 810 on target 190 can be expressed as:

$$v = v^{trans} + [\omega \times (R - R_c - v^{trans} * \Delta t)] \qquad \text{Eq. (1)}$$

where
v is the instantaneous velocity vector of the given point;
$v^{trans}$ is the translational velocity vector of the rigid body;
$\omega$ is the rotational velocity vector of the rigid body;
R is the position of the given point on the target;
$R_c$ is the center of rotation for the target; and
$\Delta t$ is the time difference of each measurement time from a given reference time.

Given the measurements available from lidar subsystem 130, the z-component of the instantaneous velocity may be expressed as:

$$v_z = v_z^{trans} [\omega \times (R - R_c - v^{trans} * \Delta t)]_z \qquad \text{Eq. (2)}$$

where
$v_z$ is the z-component of the instantaneous velocity vector;
$v_z^{trans}$ is the z-component of the translational velocity vector; and
$[\omega \times (R - R_c - v^{trans} * \Delta t)]_z$ is the z-component of the cross product.

In some implementations of the invention, frame-to-frame measurements corresponding to various features from images 155 may be made. These measurements may correspond to a position (e.g., $x^{feat}$, $y^{feat}$) and a velocity (e.g., $v_x^{feat}$, $v_y^{feat}$) for each of the features and for each frame-to-frame time interval. In implementations where a z-coordinate of position is not available from video subsystem 150, an initial estimate of z may be made using, for example, an average z component from the points from lidar subsystem 130. Least squares estimator 1120 estimates angular velocities $\omega_x$, $\omega_y$, and $\omega_z$ and translational velocities $v_x^{trans}$, $v_y^{trans}$, and $v_z^{trans}$ which may be expressed as a transformation matrix $T_{i,i+1}^{(0)}$ for each of the relevant time intervals. In some implementations of the invention, a cumulative transformation matrix corresponding to the arbitrary frame to frame time interval may be determined.

Figure 12:
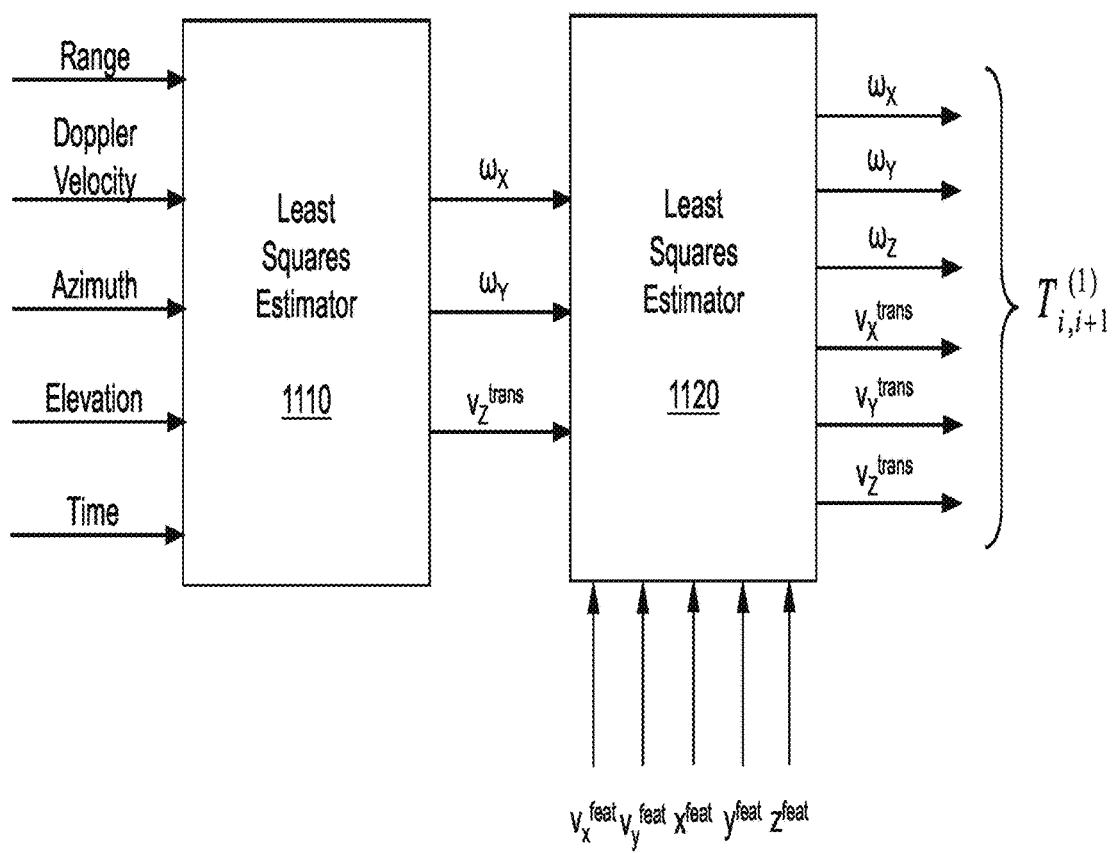
FIG. 12 illustrates a block diagram useful for processing lidar measurements and video images according to various implementations of the invention.

FIG. 12 illustrates a block diagram of a configuration of processing system 160 that may be used during a second phase of the first processing stage to estimate a trajectory of target 190 according to various implementations of the invention. In some implementations of the invention, during the second phase of the first stage, new transformation matrices (referred to herein as $T_{i,i+1}^{(1)}$) are determined from various estimates of the motion aspects of target 190. As illustrated, measurements from lidar subsystem 130 of range, Doppler velocity, azimuth, elevation and time for at each of the N points are input to a least squares estimator 1110 of processing system 160 along with the transformation matrices $T_{i,i+1}^{(0)}$ to estimate angular velocities $\omega_x$ and $\omega_y$ and translational velocity $v_z^{trans}$ over each of a series of time intervals in a manner similar to that described above during the first phase.

The primary difference between the second phase and the first phase is that least squares estimator 1120 uses the calculated z position of the features based on $T_{i,i+1}^{(0)}$ as opposed to merely an average of z position. Least squares estimator 1120 estimates new angular velocities $\omega_x$, $\omega_y$, and $\omega_z$ and new translational velocities $v_x^{trans}$, $v_y^{trans}$, and $v_z^{trans}$ which may be expressed as a transformation matrix $T_{i,i+1}^{(1)}$ for each of the relevant time intervals. Again, in some implementations of the invention, a cumulative transformation matrix corresponding to the frame to frame time interval may be determined.

Figure 13:
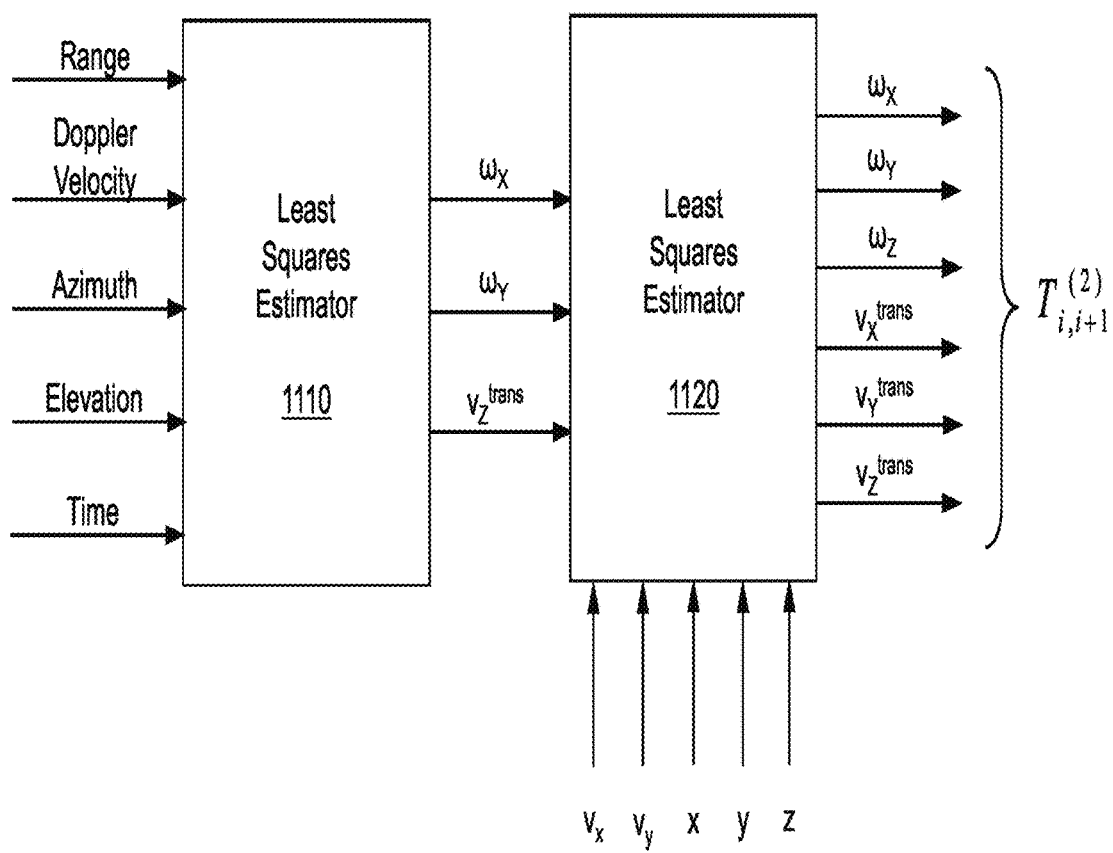
FIG. 13 illustrates a block diagram useful for processing lidar measurements and video images according to various implementations of the invention.

FIG. 13 illustrates a block diagram of a configuration of processing system 160 that may be used during a third phase of the first processing stage to estimate a trajectory of target 190 according to various implementations of the invention. In some implementations of the invention, during the third phase of the first stage, new transformation matrices (referred to herein as $T_{i,i+1}^{(2)}$) are determined from various estimates of the motion aspects of target 190. As illustrated, lidar subsystem 130 provides range, Doppler velocity, azimuth, elevation and time for at each of the points as input to a least squares estimator 1110 to estimate angular velocities $\omega_x$ and $\omega_y$ and translational velocity $v_z^{trans}$ over each of a series of time intervals in a manner similar to that described above during the first phase. In this phase, calculated values of $v_x$ and $v_y$ for each point based on $T_{i,i+1}^{(1)}$ as determined during the prior phase are input into least squares estimator 1120 as opposed to the feature measurements used above.

The primary difference between the third phase and the second phase is that least squares estimator 1120 uses $T_{i,i+1}^{(1)}$ to describe motion between the relevant frames 155. Least squares estimators 1110, 1120 estimate new angular velocities $\omega_x$, $\omega_y$, and $\omega_z$ and new translational velocities $v_x^{trans}$, $v_y^{trans}$, and $v_z^{trans}$ which may be expressed as a transformation matrix $T_{i,i+1}^{(2)}$ for each of the relevant time intervals. Again, in some implementations of the invention, a cumulative transformation matrix corresponding to the frame to frame time interval may be determined.

In various implementations of the invention, any of the phases of the first processing stage may be iterated any number of times as additional information is gained regarding motion of target 190. For example, as the transformation matrices are improved, each point 810 may be better expressed at a given reference time in relation to its measurement time.

During the first processing stage, the translational velocities of each point (not otherwise available from the lidar measurements) may be estimated using features from the frames 155. Once all velocity components are known or estimated for each point, transformation matrices may be determined without using the feature measurements as illustrated in FIG. 13.

Figure 14:
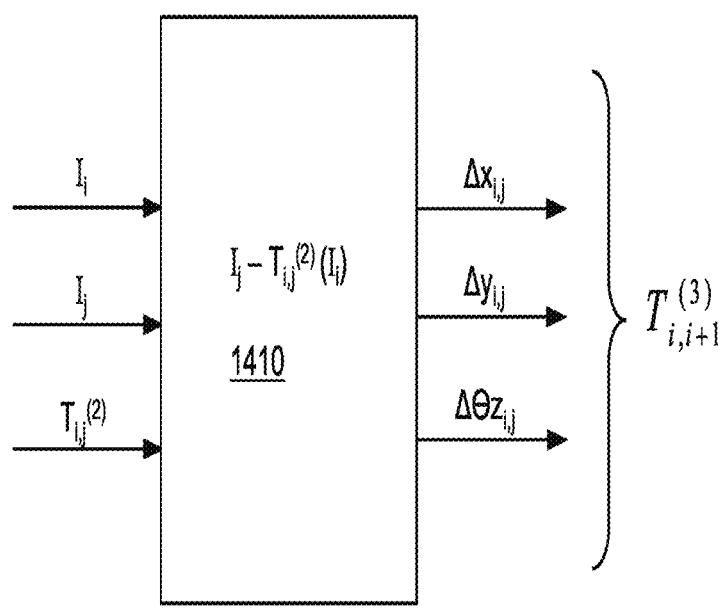
FIG. 14 illustrates a block diagram useful for processing lidar measurements and video images according to various implementations of the invention.

FIG. 14 illustrates a block diagram of a configuration of processing system 160 that may be used during a first phase of the second processing stage to refine a trajectory of target 190 according to various implementations of the invention. The first processing stage provides transformation matrices sufficient to enable images 155 to be mapped onto images at any of the frame times. Once so mapped, differences in pixels themselves (as opposed to features in images 155) from different images transformed to the same frame time may be used to further refine the trajectory of target 190. In some implementations, various multi-frame corrections may be determined, which in turn through the least square estimator can be used for obtaining offsets between the consecutive images $\Delta x_{i,i+1}$, $\Delta y_{i,i+1}$, $\Delta\Theta z_{i,i+1}$. These corrections may be used to refine the transformation matrices (for example, matrices $T_{i,i+1}^{(2)}$ to $T_{i,i+1}^{(3)}$). In some implementations of the invention, during the first phase of the second processing stage, a series of new transformation matrices (referred to herein as $T_{i,i+1}^{(3)}$) are refinements of $T_{i,i+1}^{(2)}$ on the basis of the offsets between image $I_i$ and an image $I_j$, namely, $\Delta x_{i,j}$, $\Delta y_{i,j}$, $\Delta\Theta z_{i,j}$. As illustrated, an estimator 1410 determines a difference between an image $I_i$ and an image $I_j$ using the appropriate transformation matrix $T_{i,j}^{(2)}$ to express the images at the same frame time.

Figure 15:
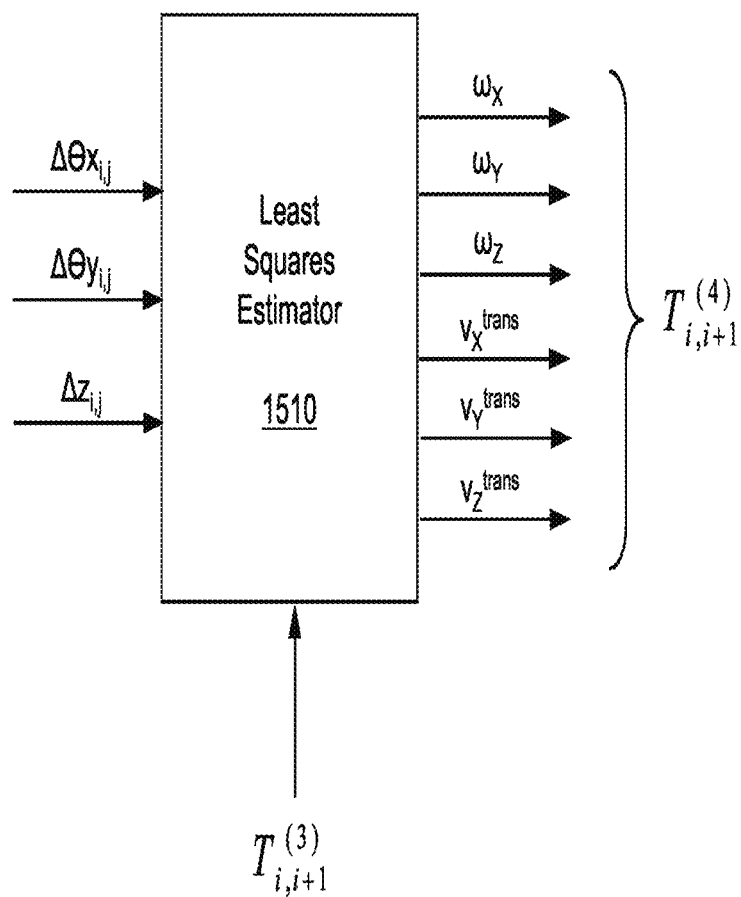
FIG. 15 illustrates a block diagram useful for processing lidar measurements and video images according to various implementations of the invention.

FIG. 15 illustrates a block diagram of a configuration of processing system 160 that may be used during a second phase of the second processing stage to further refine a trajectory of target 190 according to various implementations of the invention. To the extent that additional accuracy is necessary, the transformation matrices from the first phase of the second processing stage (e.g., $T_{i,i+1}^{(3)}$) may be used in connection with the measurements from lidar subsystem 130 to further refine the transformation matrices (referred to herein as $T_{i,i+1}^{(4)}$). In some implementations of the invention, during this phase, measurements from lidar subsystem 130 that occur within any overlap regions 360, 450 are used. These measurements correspond to multiple measurements taken for the same point (or substantially the same point) at different times. This phase is based on the premise that coordinate measurements of the same point on target 190 taken different times should transform precisely to one another with a perfect transformation matrix, i.e. points measured at the different times that have the same x and y coordinates should have the same z coordinate. In other words, all coordinates of the underlying points should directly map to one another at the different points in time. The differences in z coordinates (i.e., corrections) between the measurements at different times can be extracted and input to the least square estimator. Through the least square estimator, the corrections to the transformation parameters between the consecutive frames may obtained and may be expressed as $\Delta z_{i,i+1}$, $\Delta\Theta x_{i,i+1}$, and $\Delta\Theta y_{i,i+1}$. These corrections may be used to refine the the transformation matrices $T_{i,i+1}^{(3)}$ to $T_{i,i+1}^{(4)}$. In some implementations of the invention, multiple measurements corresponding to use of an overscan beam may be used in a similar manner.

In some implementations of the invention, factory calibration may be performed to calibrate (i.e., register) measurements obtained from video subsystem 150 with measurements obtained from lidar subsystem 130 as described in, for example, U.S. patent application Ser. No. 13/839,216, entitled, "System and Method for Calibrating Video and Lidar Subsystems," filed on Mar. 15, 2013, and incorporated herein by reference as if reproduced below in its entirety. In some implementations of the invention, field calibration, based on a target's facial features, may be performed to calibrate measurements obtained from video subsystem 150 with measurements obtained from lidar subsystem 130 as described in, for example, U.S. patent application Ser. No. 13/840,833, entitled, "System and Method for Field Calibrating Video and Lidar Subsystems using Facial Features," filed on Mar. 15, 2013, and incorporated herein by reference as if reproduced below in its entirety. In some implementations, the video subsystem 150 and the lidar subsystem 130 may be aligned with one another by mapping the measurements of various facial features obtained by each of the subsystems to one another. In some implementations, various components of the lidar subsystem 130 (e.g., scanning mirrors, etc.) are aligned with one another by mapping the measurements of various facial features obtained by each of the components to one another.

In some implementations, beam steering mechanism 140 of the lidar subsystem 130 may include a first scanning mirror and a second scanning mirror, each of which may move/scan independently from one another as well as from video subsystem 150. In some implementations, three-dimensional measurements (also referred to as 3D point clouds, for example, a point cloud 930) may be obtained using the first scanning mirror and the second scanning mirror. In some implementations, processing system 160 may receive the three-dimensional measurements from lidar subsystem 130.

In some implementations, processing system 160 may compare a plurality of first 3D point clouds (obtained using the first scanning mirror) with a plurality of second 3D point clouds (obtained using the second scanning mirror. In some implementations, processing system 160 may determine differences in the locations (i.e., offsets) of a plurality of facial features between the first 3D point clouds and the second 3D point clouds based on the comparison. In some implementations, processing system 160 may determine calibration adjustments to be made between the first and second scanning mirrors based on the determined differences. In other words, by comparing the 3D point clouds obtained using the first scanning mirror with the 3D point clouds obtained using the second scanning mirror, differences in the locations (e.g., offsets) of various facial features between the respective point clouds may be used to determine calibration adjustments between the first and second scanning mirrors as would be appreciated.

In some implementations, the offsets (also referred to as $\Delta XYZ$) between the respective 3D point clouds may be determined at multiple ranges (i.e., distances) and/or locations. In some implementations, based on these offsets at different scanning positions, the calibration adjustments may be determined. In some implementations, the calibration adjustments may be used to update/correct/adjust transformation parameters that would otherwise transform a coordinate system of the second 3D point clouds (obtained using the second scanning mirror) to a coordinate system of the first 3D point clouds (obtained using the first scanning mirror) and vice versa. In effect, this calibrates the second 3D point clouds obtained from the second scanning mirror to the first 3D point clouds obtained from the first scanning mirror.

In some implementations, by determining offsets at different locations or positions (providing sufficient variability in the measurements), a full set of transformation parameters may be updated, effectively accounting for the translation and rotation of the two measurement subsystems.

In some implementations, processing system 160 may align the lidar subsystem 130 with the video subsystem (i.e., align the two subsystems) by subdividing the face and aligning the subsystems horizontally and vertically. In some implementations, for horizontal alignment between the video system 150 and the lidar subsystem 130, processing system 160 may determine a 3D symmetry plane dividing the face into left and right halves based on the three-dimensional measurements (i.e., 3D point clouds) obtained from the lidar subsystem 130. In some implementations, the 3D symmetry plane "cuts" the face through the tip of the nose, nose-bridge, lips, and forehead. In some implementations, processing system 160 may determine locations of symmetrical features of the face (namely, eye locations and nostril locations) based on images from the video subsystem 150. In some implementations, once the locations of the symmetrical facial features are determined from the video system 150, processing system 160 may determine offsets in the locations of the symmetrical facial features relative to the 3D symmetry plane (as presumably, symmetrical features should be equidistant from the symmetry plane on the left and right sides thereof). In some implementations, the locations of the symmetrical facial features may be determined using any number of 2D facial feature algorithms as would be appreciated. In some implementations of the invention, a Fraunhofer face detection algorithm may be used to detect eye positions, nostril positions, etc. In some implementations, an eye detection algorithm from OpenCV may be used. In some implementations of the invention, the averages of the locations of the facial features from different algorithms may be used as would be appreciated. For example, the locations of the eyes determined from the Fraunhofer face detection algorithm may be averaged with the locations of the eyes determined from the OpenCV eye detection algorithm. In some implementations, these averages may be weighted depending on, for example, a confidence associated with each of the algorithms.

In some implementation, the face symmetry plane may be inaccurate, such a plane may be used to show the orientation of the face, but many faces are assymetrical by its nature. In some implementations, processing system 160 may locate/determine a corresponding noseridge in the 3D point clouds from the lidar subsystem 130 as the relative maximum "ridge" between the two face halves, which would be true symmetry line of the face. In some implementations, once the symmetrical face features like eyes and/or nostrils are determined from the video subsystem 150, the centers of these features are presumed to be on the noseridge. In some implementations, the horizontal offset may be determined as the offset between the center of the symmetrical features from the symmetry plane, corrected by the offset of the noseridge from the symmetry plane.

In some implementations, for vertical alignment between the video system 150 and the lidar subsystem 130, processing system 160 may match a location of the lip line between the video image of the video subsystem 150 and the 3D point clouds of the lidar subsystem 130. On the video image, the lip line is typically the darkest point in the lip area, while in the 3D point cloud the lip line may be localized as the dip between the upper and lower lips. This "lip valley" determined from each of the two subsystems may be used to accomplish vertical alignment (i.e., adjustments up and down to align the lip valley) and vertical offsets and/or calibration adjustments between the two subsystems as would be appreciated. In some implementations, processing system 160 may compare the lip line estimate from the video subsystem with the lip line estimate from the lidar subsystem. In some implementations, processing system 160 may determine one or more vertical offsets based on the comparison. In some implementations, processing system 160 may determine one or more vertical calibration adjustments to be made between the lidar subsystem and the video subsystem based on the vertical offsets.

In some implementations, the calibration offset between the 3D point clouds and the video image can be found from the irises misalignments. Particularly, the laser is mostly absorbed by irises, producing the signal with low SNR, which allows their precise 3D (lidar) identifications. In most cases, the iris location can also be found from the video image by finding the maxima of the gradient semi-circle intensity. In some implementations, lidar video misalignments between the irises may provide the horizontal and vertical offsets between the lidar and video subsystems, which can be used solely or in addition to the offsets from the symmetry plane and the lip lines. This is discussed in further detail below.

Other facial features may be used in addition to those discussed above as would be appreciated. For example, the nosetip as determined from both the video image and the 3D point cloud may also be used to provide aspects of both vertical and horizontal alignment as would be appreciated.

The vertical offsets and the horizontal offsets correspond to the differences between the video image and the 3D point cloud. By calculating such offsets for multiple ranges and positions, the transformation parameters (for example projective transformations) between the coordinate cells of the video subsystem and the lidar subsystem may be adjusted/updated, thereby aligning/calibrating these two subsystems with one another as would be appreciated.

The calibration procedures discussed above may be performed continuously in the background during operation of the combined video/lidar system 100, at periodic intervals during its operation or at any time/event specified by an operator as would be appreciated.

Figure 16:
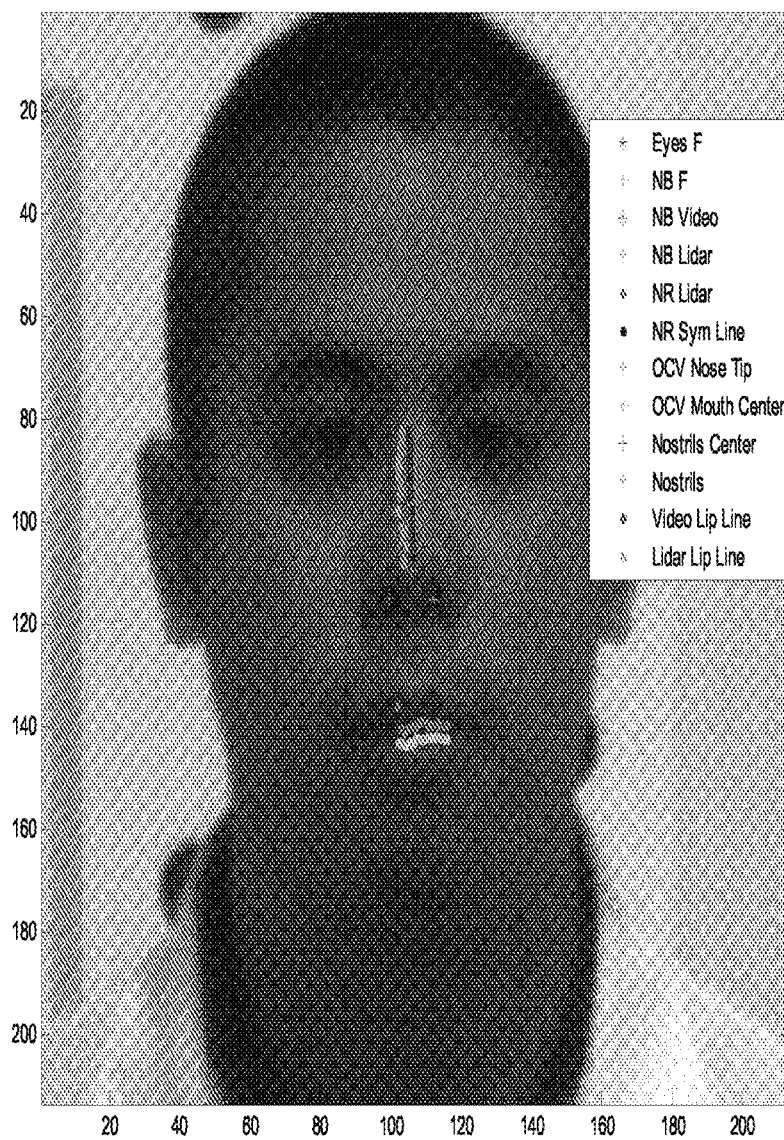
FIG. 16 illustrates facial features monitored by the lidar subsystem and the video subsystem according to various implementations of the invention.

FIG. 16 illustrates facial features monitored by the lidar subsystem and the video subsystem according to various implementations of the invention. In some implementations, the facial features depicted in FIG. 16 may be used for calibrating the video subsystem 150 and the lidar subsystem 130. In some implementations, FIG. 16 depicts the following exemplary facial features determined based on images from the video subsystem 150: eyes (designated as Eyes F in FIG. 16), an estimate of the nosebridge based on the eyes F (designated as NB F in FIG. 16), estimate of the nosebridge based on eye detection algorithm from OpenCV (designated as NB Video in FIG. 16), an OpenCV estimate of the nose tip (designated as OCV Nose Tip in FIG. 16), an OpenCV estimate of the mouth center (designated as OCV Mouth Center in FIG. 16), an estimate of the individual nostrils (designated as Nostrils in FIG. 16), a center of the nostrils (designated as Nostril Center in FIG. 16), and a video estimate of vertical lip line position (for multiple ranges)-looking for changes in video luminance (designated as Video Lip Line in FIG. 16).

In some implementations, FIG. 16 further depicts the following exemplary facial features determined based on 3D measurements/3D lidar data/3D point clouds from the lidar subsystem 130: an estimate of the nosebridge (designated as NB Lidar in FIG. 16), an estimate of the nose ridge (designated as NR Lidar in FIG. 16), nose ridge extracted from the face symmetry line (designated as NR Sym Line in FIG. 16), and a lidar estimate of vertical lip line position (for multiple ranges)—"valley-processing" (designated as Lidar Lip Line in FIG. 16).

Figure 17:
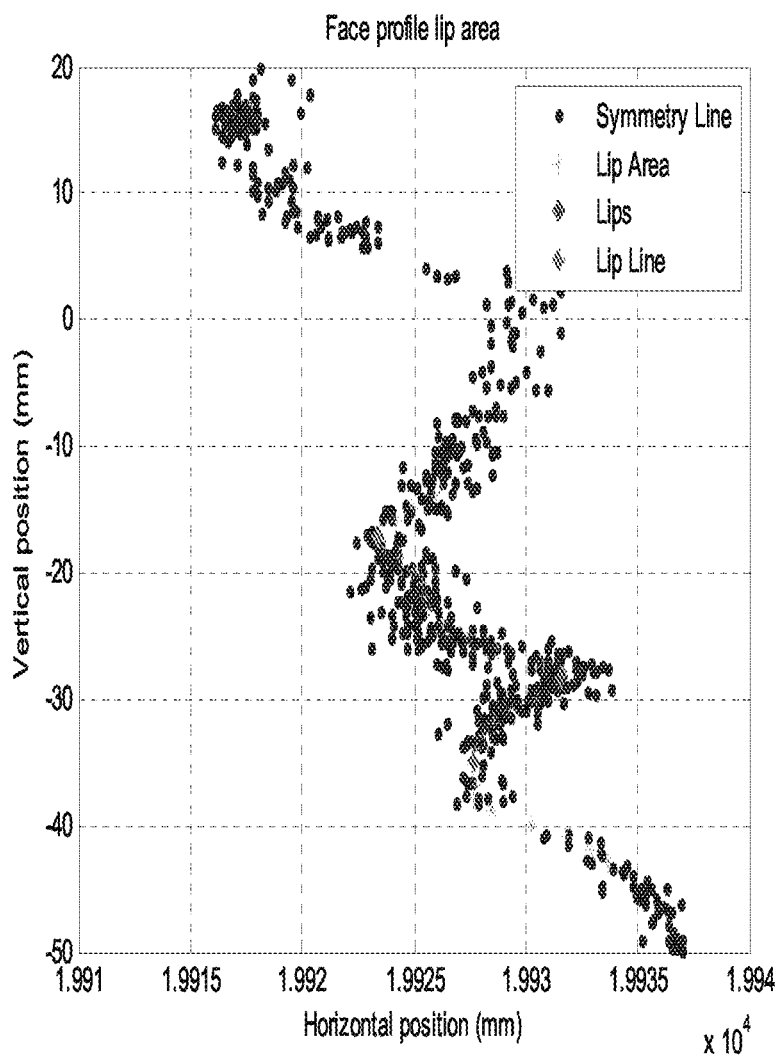
FIG. 17 illustrates an exemplary lidar-based face profile according to various implementations of the invention.

FIG. 17 illustrates an exemplary lidar-based face profile (i.e., face profile based on the 3D point clouds from the lidar subsystem 130) according to various implementations of the invention. FIG. 17 depicts the face profile at the symmetry line (designated as Symmetry Line), the smoothed symmetry line at the lip area (designated as Lip Area), the upper and lower lips (designated as Lips), and the lip line (designated as Lip Line).

Figure 18:
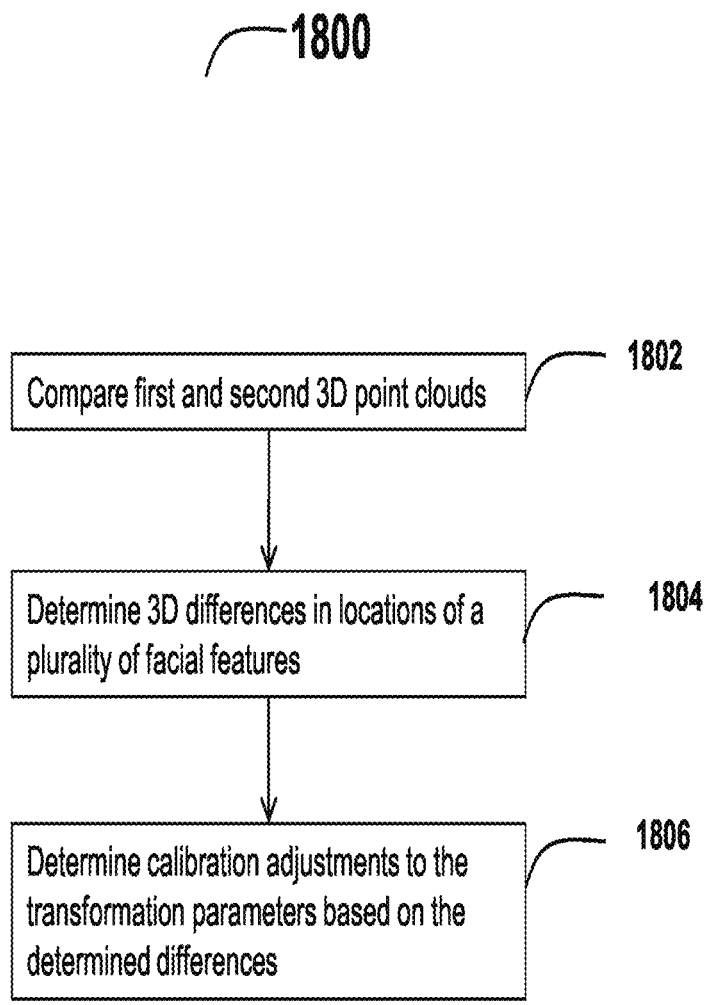
FIG. 18 illustrates a flowchart depicting example operations performed by a system for calibrating a lidar subsystem, according to various aspects of the invention.

FIG. 18 illustrates a flowchart depicting example operations performed by a system for calibrating a lidar subsystem, according to various aspects of the invention. In some implementations, the described operations may be accomplished using one or more of the components described herein. In some implementations, various operations may be performed in different sequences. In other implementations, additional operations may be performed along with some or all of the operations shown in FIG. 18. In yet other implementations, one or more operations may be performed simultaneously. In yet other implementations, one or more operations may not be performed. Accordingly, the operations described in FIG. 18 and other drawing figures are exemplary in nature and, as such, should not be viewed as limiting.

In some implementations, in an operation 1802, process 1800 may compare a plurality of first 3D point clouds (obtained using the first scanning mirror) with a plurality of second 3D point clouds (obtained using the second scanning mirror). In some implementations, in an operation 1804, process 1800 may determine differences in the locations (i.e., offsets) of a plurality of facial features between the first 3D point clouds and the second 3D point clouds based on the comparison. In some implementations, in an operation 1806, process 1800 may determine calibration adjustments to be made between the first and second scanning mirrors based on the determined differences. In other words, by comparing the 3D point clouds obtained using the first scanning mirror with the 3D point clouds obtained using the second scanning mirror, differences in the locations (e.g., offsets) of various facial features between the respective point clouds may be used to determine calibration adjustments to the transformation parameters based on the determined differences as would be appreciated.

Figure 19:
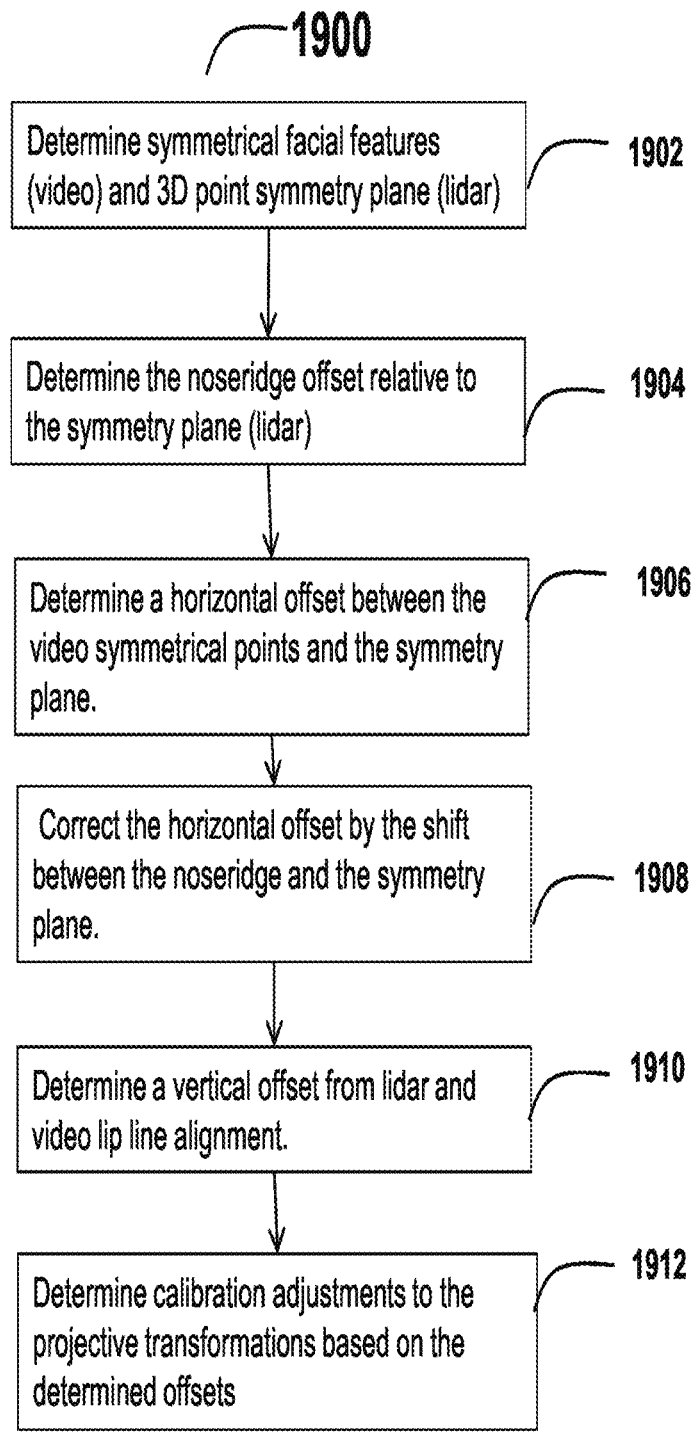
FIG. 19 illustrates a flowchart depicting example operations performed by a system for calibrating a lidar subsystem and a video subsystem, according to various aspects of the invention.

FIG. 19 illustrates a flowchart depicting example operations performed by a system for calibrating a lidar subsystem and a video subsystem, according to various aspects of the invention. In some implementations, in an operation 1902, operation 1900 may determine locations of symmetrical features of the face (namely, eye locations and nostril locations) based on images from the video subsystem 150 as well as the 3D face symmetry plane from the point cloud. In some implementations, the 3D symmetry plane may be determined by dividing the face into left and right halves based on the three-dimensional measurements (i.e., 3D point clouds) obtained from the lidar subsystem 130. In some implementations, in an operation 1904, operation 1900 may determine the noseridge and the noseridge offset relative to the 3D symmetry plane.

In some implementations, in an operation 1906, process 1900 may determine a horizontal offset between the video symmetrical points (i.e. locations of the plurality of symmetrical features) and the 3D symmetry plane. In some implementations, in an operation 1908, process 1900 may correct the horizontal offset by the shift between the 3D symmetry plane and the noseridge.

In some implementations, in operation 1910, process 1900 may determine the vertical offset between the lidar and video lip line alignments. In some implementations, process 1900 may determine a first location of lip line based on the images and a second location of the lip line based on the point cloud. In some implementations, process 1900 may determine the vertical offset based on the first and second locations.

In some implementations, in an operation 1912, process 1900 may determine calibration adjustments to the projective transformations (transformation parameters) based on determined video and lidar offsets (i.e., horizontal and vertical offsets).

As mentioned above, in some implementations, a calibration offset between the 3D point clouds and the video image (i.e., calibration offsets between lidar subsystem 130 and video subsystem 150) may be determined from misalignments in location of the irises. Laser light is absorbed by irises to a greater degree than the other tissues of the eye or surrounding face. Thus, return signals from the iris(es) are attenuated in relation to return signals from other surrounding tissues and detected return signals from the irises have a lower signal-to-noise ratio, amplitude, etc. By locating and identifying those 3D points in the point cloud in the region of the eye that have lower signal-to-noise ratios than their surrounding 3D points, the iris may be located by lidar susbsystem.

In some implementations of the invention, because of scanning, lidar subsystem 130 "samples" a region of the eye, and hence, does not provide a sufficient number of points to clearly map out the iris. In these implementations, the locations of the points that have an attenuated reflected signal in the region of the eye may be averaged to provide an average location, or centroid location, of such points which may be used to approximate a centroid of the iris. In some implementations of the invention, lidar subsystem 130 may focus a scan in the region of the eye to gain additional samples of the eye and fully sample the iris as would be appreciated.

Figure 20:
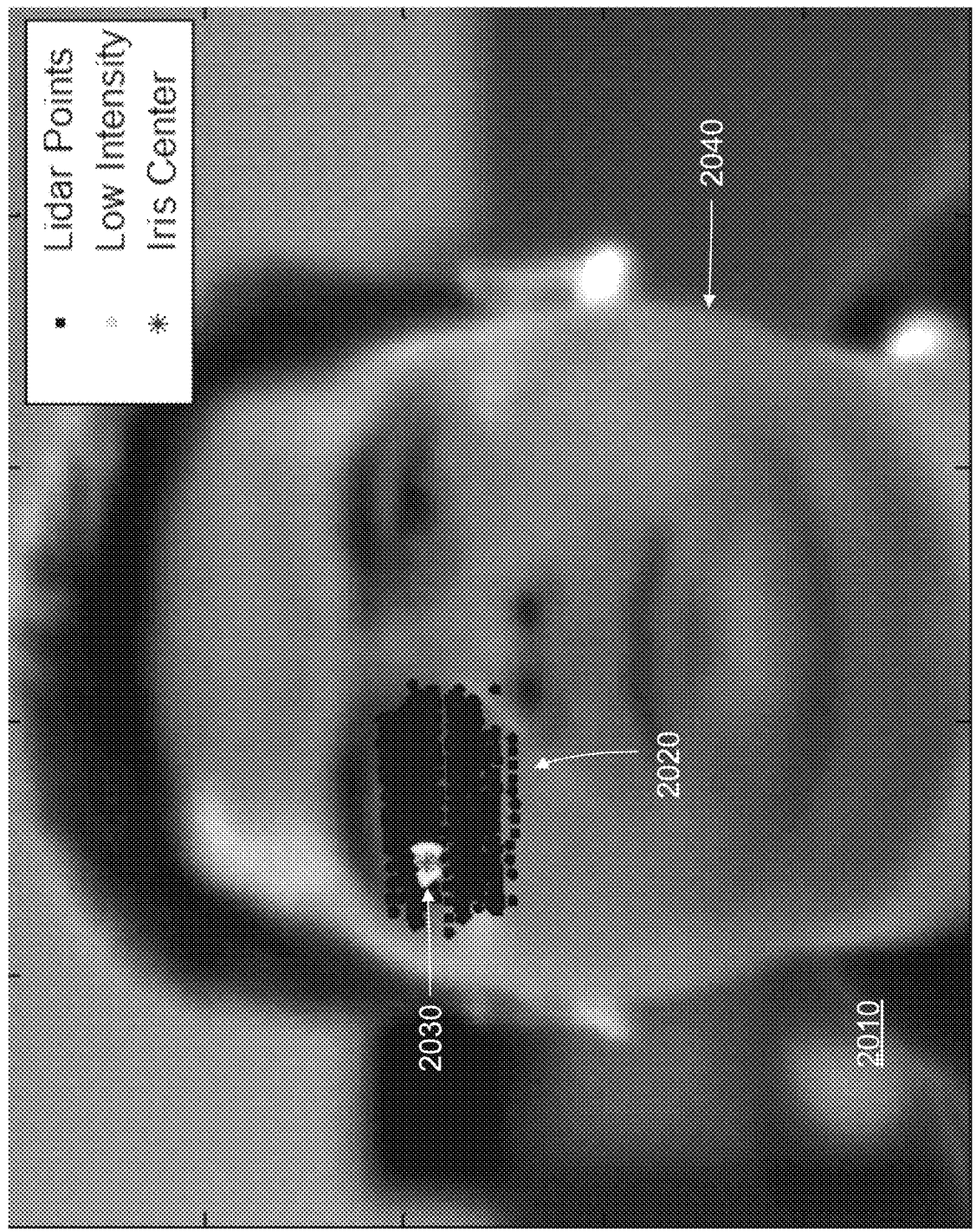
FIG. 20 illustrates an image from a video subsystem on which is overlayed a number of points measured by a lidar subsystem in accordance with various implementations of the invention.

FIG. 20 illustrates an image 2010 from video subsystem 150 on which is overlayed a number of points 2020 (illustrated as dark dots in FIG. 21) including a subset 2030 of points 2020 (illustrated as light dots in FIG. 21 and referred to herein as "iris points 2030) measured by lidar subsystem 130 in accordance with various implementations of the invention. Iris points 2030 correspond to those points 2020 that have an attenuated reflected signal relative to other points 2020. This attenuated reflected signal of iris points 2030 may be discriminated from such other points 2020 in the region of the eye as being points corresponding to the iris. For example, points 2020 having an attenuated reflected signal of a threshold 10 dB or more in relation to other points 2020 in the region of the eye may be identified as iris points 2030. Other threshold values may be used depending on factors associated with lidar subsystem 130, etc., and may be set based on experimentation as would be appreciated.

Figure 21:
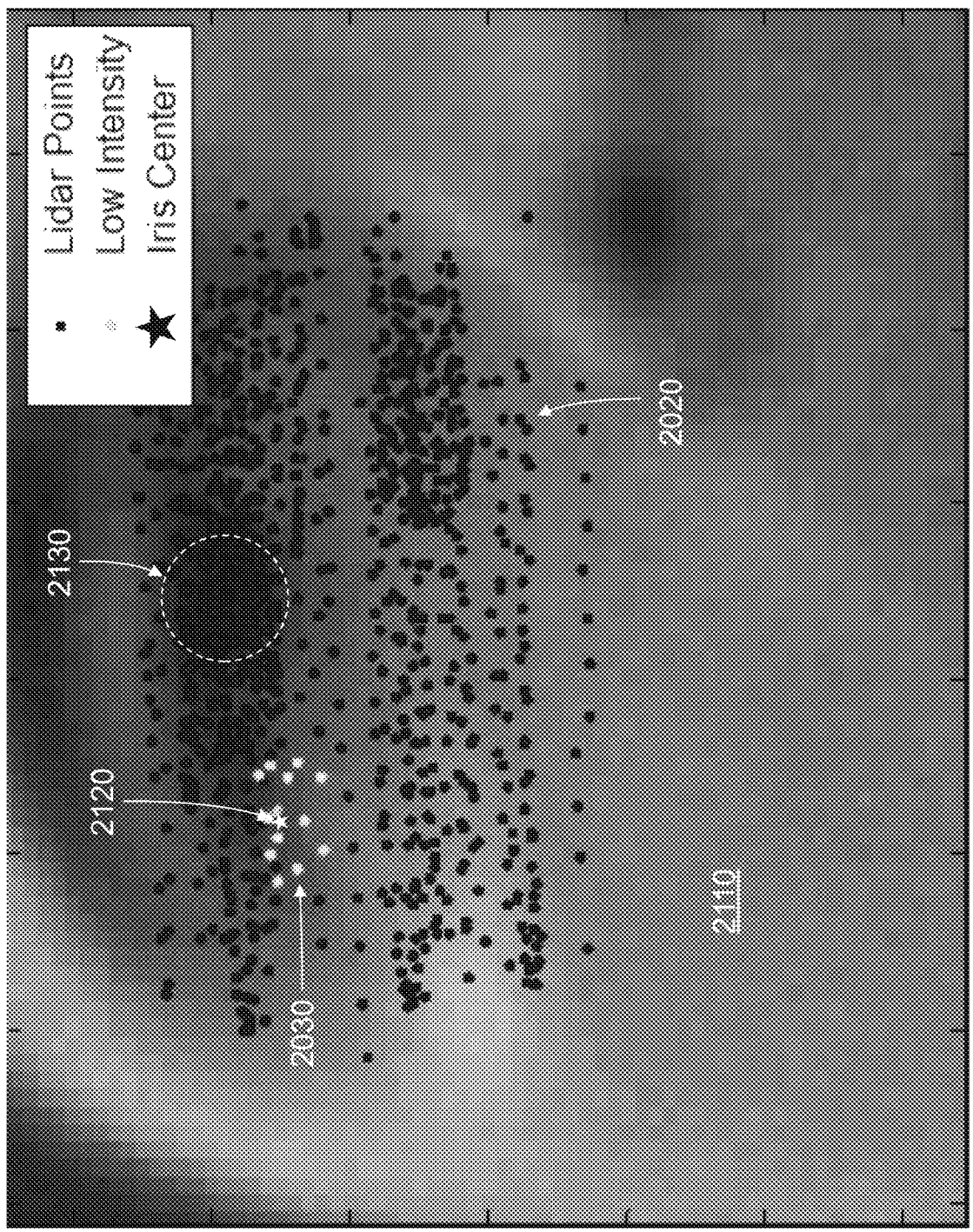
FIG. 21 illustrates a relevant portion of the image illustrated in FIG. 20 in further detail.

FIG. 21 illustrates a relevant portion 2110 of the image 2010 illustrated in FIG. 20 in further detail. In particular, FIG. 21 illustrates a centroid 2120 of iris points 2030, which as discussed above, may be determined as an average location of the iris points 2030. FIG. 21 also illustrates an image iris 2130 as a dashed line around an approximate location of the iris in image 2010 (solely for purposes of illustration). As illustrated in FIG. 21, iris points 2030 are offset from image iris 2130 as a result of the misalignment between lidar subsystem 130 and video subsystem 150.

Figure 22:
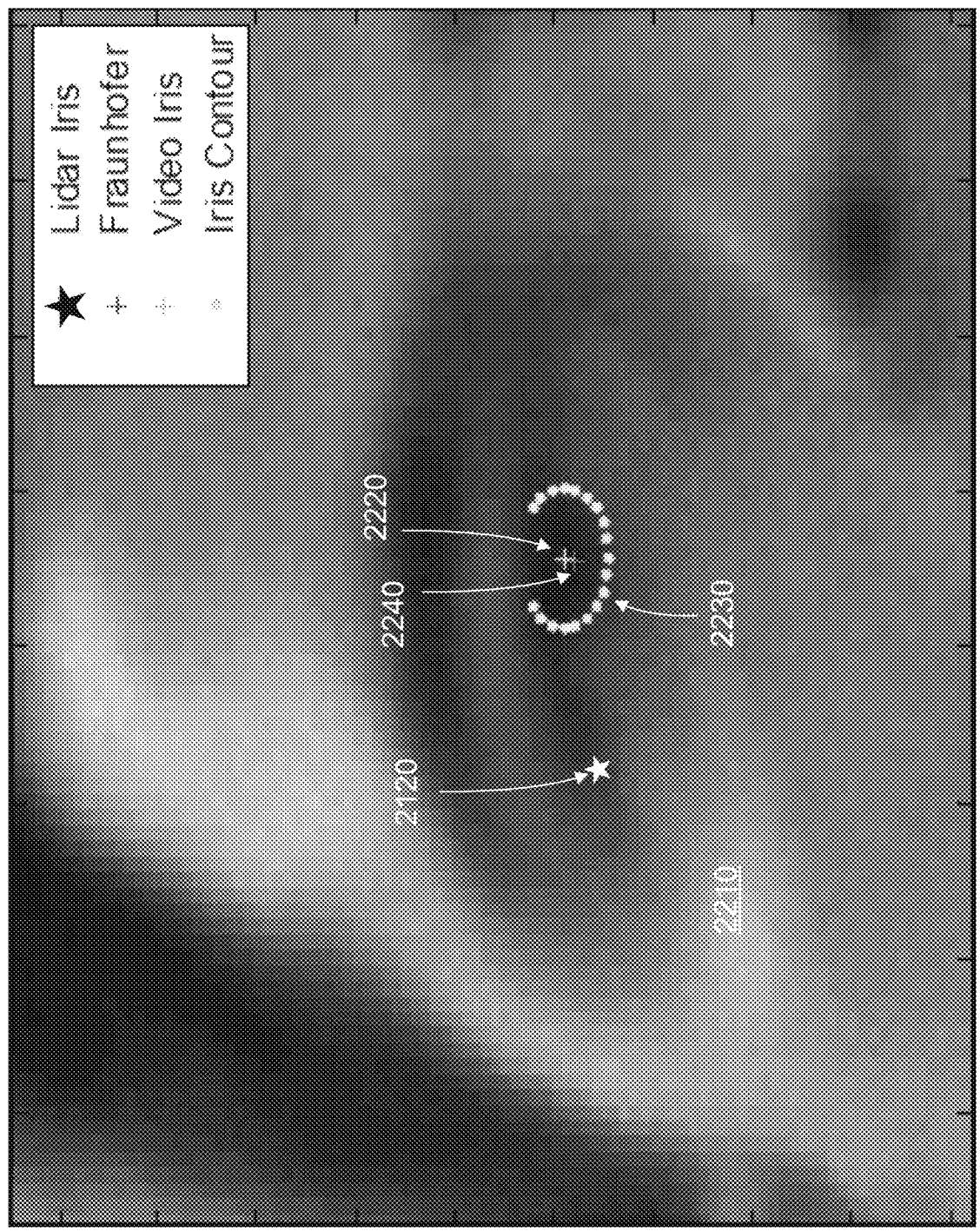
FIG. 22 illustrates an offset between a location of an iris based on the image from the video subsystem and a location of the iris based on the measurements from the lidar subsystem.

FIG. 22 illustrates a relevant portion 2210 of the image 2010 illustrated in FIG. 20 in further detail. In particular, FIG. 22 illustrates an iris contour 2230 and a centroid 2220 and a centroid 2240 as determined from image 2010 via various facial recognition techniques as would be appreciated. In some implementations of the invention, centroid 2220 may be determined as an average location of points in iris contour 2230 as would be appreciated. In some implementations of the invention, centroid 2240 may be determined using various well-established Fraunhofer facial recognition processing techniques as would be appreciated. In various implementations of the invention, either centroid 2220 or centroid 2240 may be used as a centroid of the iris. In various implementations of the invention, an average (weighted or otherwise) of centroids 2220, 2240 and/or other centroids determined from image 2010 may be used as the centroid of the iris.

As illustrated in FIG. 22, a misalignment (i.e., calibration offset) exists in between centroid 2120 determined from lidar subsystem 130 and centroids 2220, 2240 determined from video subsystem 150. This calibration offset is apparent in FIG. 21 as the iris points 2030 from lidar subsystem 130 are not mapped onto a face 2040 of image 2010 where one would expect them. For example, one would expect iris points 2030 to be mapped further to the right and slightly up from their position in FIG. 21. This "mismapping" is a result of the misalignment between lidar subsystem 130 and video subsystem 150.

FIG. 22 also illustrates an offset between a location of an iris based on the image from the video subsystem and a location of the iris based on the measurements from the lidar subsystem. In other words, FIG. 22 illustrates the offset between centroid 2120 determined from measurements from lidar subsystem 130 and centroid 2220, 2240 determined from images from video subsystem 150. As discussed above, this offset may be used to correct the alignment between lidar subsystem 130 and video subsystem 150.

Figure 23:
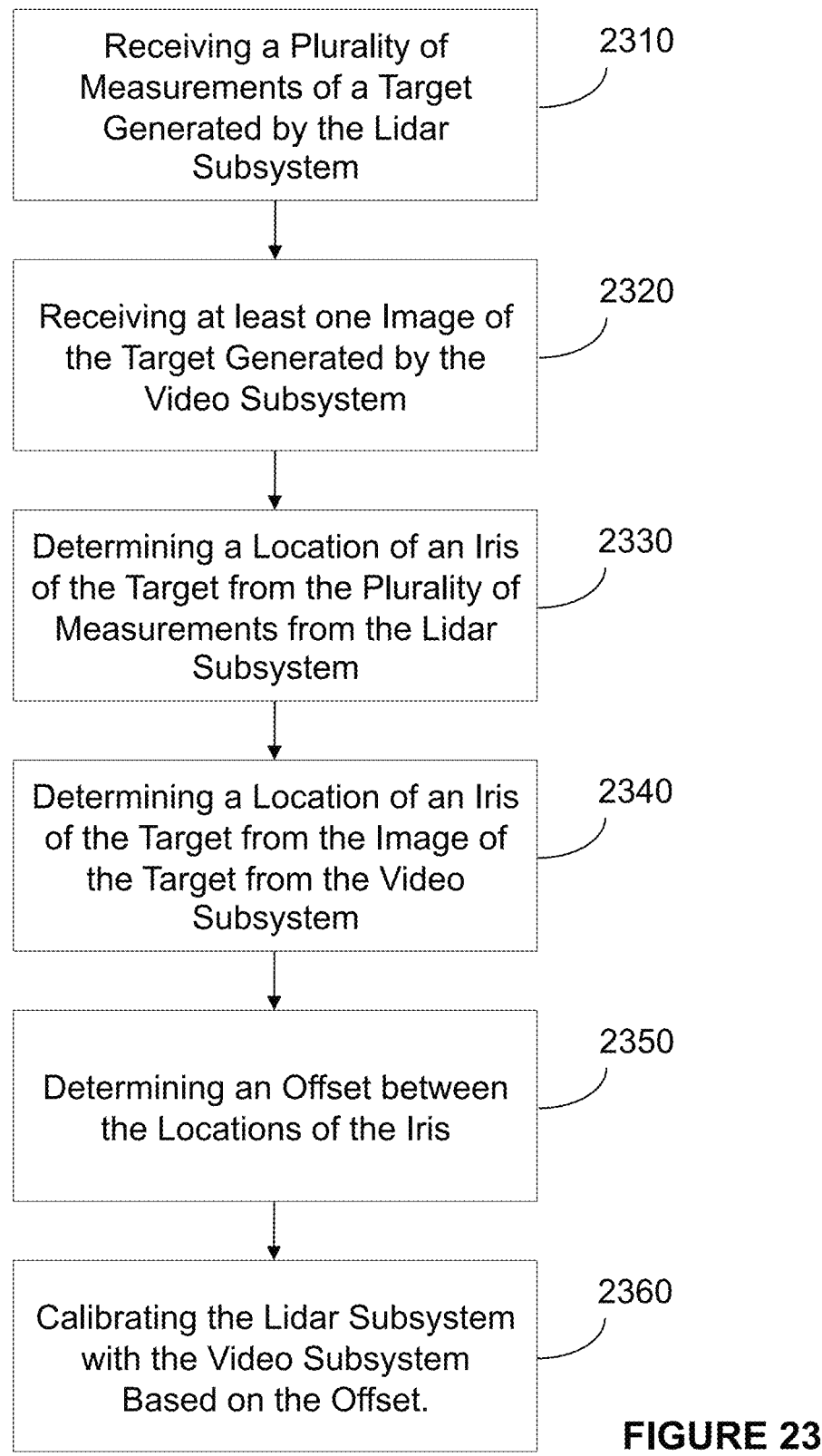
FIG. 23 illustrates an operation of a processing system to determine calibration offsets between lidar subsystem 130 and video subsystem 150 in accordance with various implementations of the invention.

FIG. 23 illustrates an operation of processing system 160 to determine calibration offsets between lidar subsystem 130 and video subsystem 150 in accordance with various implementations of the invention. In an operation 2310, processing system 160 receives a plurality of measurements of a target generated by lidar subsystem 130. In an operation 2320, processing system 160 receives an image of a target from video subsystem 150. In some implementations of the invention, a time of the image of the target matches closely to a time(s) when lidar subsystem 130 was scanning an eye or iris region of the target; hence the plurality of measurements generated by lidar system coincide closely in time with the image of the target. In an operation 2330, processing system 160 determines a centroid (or other suitable location) of an iris of the target based on the plurality of measurements from lidar subsystem 130. As discussed above, in some implementations of the invention, this may be accomplished by discriminating the measurements based on an amplitude of a signal reflected back from the target. In an operation 2340, processing system 160 determines a centroid (or other suitable location) of an iris of the target based on the image from video subsystem 150. In an operation 2350, processing system 160 determines an offset between the centroid of the iris determined from the measurements from lidar subsystem 130 and the centroid of the iris determined from the image from video subsystem 150. In an operation 2360, processing system 160 calibrates lidar subsystem 130 with video subsystem 150 based on the offset between the respective centroids. In some implementations of the invention, calibration between lidar subsystem 130 and video subsystem 150 may be performed based scans and image(s) at a specific period of time or over multiple periods of time (i.e., as a result of revisiting or rescanning the eye/iris region of the target) as would be appreciated.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for calibrating a lidar subsystem with a video subsystem, the method comprising:
receiving a plurality of measurements generated by the lidar subsystem, each of the plurality of three-dimensional measurements corresponding to a point on a target, each of the plurality of measurements corresponding to a location of the point on the target and an amplitude of a return signal from the point on the target;
receiving at least one image of the target generated by the video subsystem;
determining a first location of an iris of the target based on the amplitude of a return signal of at least some of the plurality of three-dimensional measurements;
determining a second location of the iris of the target based on the image of the target;
determining an offset between the first location of the iris and the second location of the iris; and
calibrating the lidar subsystem with the video subsystem based on the offset.

2. The method of claim 1, wherein a location of the point on the target comprises an azimuth, an elevation, and a range.

3. The method of claim 2, wherein the location of the point on the target further comprises a Doppler velocity.

4. The method of claim 1, wherein determining a first location of an iris of the target based on the amplitude of the return signal of at least some of the plurality of measurements comprises:
determining which of the plurality of three-dimensional measurements have a low amplitude of the return signal relative to other of the plurality of measurements.

5. The method of claim 4, wherein determining a first location of an iris of the target based on the amplitude of the return signal of at least some of the plurality of three-dimensional measurements further comprises:
for those of the plurality of measurements that have the low amplitude of the return signal, determining a centroid location from the respective locations of those of the plurality of measurements; and
wherein the first location is the centroid location.

6. The method of claim 1, wherein determining a second location of the iris of the target based on the image of the target comprises:
determining an iris contour of the iris of the target based on the image of the target.

7. The method of claim 6, wherein determining the second location of the iris of the target based on the image of the target further comprises:
determining a centroid location from the iris contour; and
wherein the second location is the centroid location.

8. The method of claim 1, wherein determining a second location of the iris of the target based on the image of the target comprises:

performing Fraunhofer processing on the image of the target to identify a centroid location of the iris of the target; and wherein the second location is the centroid location.

9. A system for calibrating a lidar subsystem with a video subsystem, the system comprising:
- a lidar subsystem configured to generate a plurality of measurements, each of the plurality of measurements corresponding to a point on a target, each of the plurality of measurements comprising a location of the point on the target and an amplitude of a return signal from the point on the target;
- a video subsystem configured to provide an image of the target; and
- a processor configured to:
  - receive the plurality of measurements from the lidar subsystem,
  - receive the at least one image of the target from the video subsystem,
  - determine a first location of an iris of the target based on the amplitude of the return signal of at least some of the plurality of measurements,
  - determine a second location of the iris of the target based on the image of the target,
  - determine an offset between the first location of the iris and the second location of the iris,
  - calibrate the lidar subsystem with the video subsystem based on the offset.

10. The system of claim 9, wherein a location of the point on the target comprises an azimuth, an elevation, and a range.

11. The system of claim 10, wherein the location of the point on the target further comprises a Doppler velocity.

12. The system of claim 9, wherein the determine a first location of an iris of the target based on the amplitude of the return signal of at least some of the plurality of three-dimensional measurements comprises:
- determine which of the plurality of measurements have a low amplitude relative to other of the plurality of measurements.

13. The system of claim 12, wherein the determine a first location of an iris of the target based on the amplitude of the return signal of at least some of the plurality of measurements further comprises:
- for those of the plurality of measurements that have the low amplitude, determine a centroid location from their respective locations, and
- wherein the first location is the centroid location.

14. The system of claim 9, wherein determine a second location of the iris of the target based on the image of the target comprises:
- determine an iris contour of the iris of the target based on the image of the target.

15. The system of claim 14, wherein determine the second location of the iris of the target based on the image of the target further comprises:
- determine a centroid location from the iris contour, and
- wherein the second location is the centroid location.

16. The system of claim 9, wherein determine a second location of the iris of the target based on the image of the target comprises:
- perform Fraunhofer processing on the image of the target to identify a centroid location of the iris of the target; and
- wherein the second location is the centroid location.

* * * * *